(12) United States Patent
Wray et al.

(10) Patent No.: US 8,223,770 B2
(45) Date of Patent: Jul. 17, 2012

(54) NETWORK VIRTUALIZATION

(75) Inventors: Michael John Wray, Bath (GB); Christopher Ian Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 11/575,382

(22) PCT Filed: Aug. 3, 2005

(86) PCT No.: PCT/EP2005/053800
§ 371 (c)(1), (2), (4) Date: Aug. 20, 2007

(87) PCT Pub. No.: WO2006/029940
PCT Pub. Date: Mar. 23, 2006

(65) Prior Publication Data
US 2007/0280243 A1 Dec. 6, 2007

(30) Foreign Application Priority Data
Sep. 17, 2004 (GB) .................................. 0420664.5

(51) Int. Cl.
H04L 12/28 (2006.01)
H04L 12/56 (2006.01)
G06F 15/16 (2006.01)

(52) U.S. Cl. ........................................ 370/392; 709/245

(58) Field of Classification Search .................. 370/392; 709/223, 238, 245; 718/1
See application file for complete search history.

(56) References Cited

U.S. PATENT DOCUMENTS

| | | | |
|---|---|---|---|
| 5,745,703 A * | 4/1998 | Cejtin et al. ................... | 709/238 |
| 5,825,772 A | 10/1998 | Dobbins et al. | |
| 5,959,989 A | 9/1999 | Gleeson et al. | |
| 6,061,349 A | 5/2000 | Coile | |
| 6,081,833 A * | 6/2000 | Okamoto et al. .............. | 709/213 |
| 6,343,083 B1 * | 1/2002 | Mendelson et al. .......... | 370/466 |
| 6,343,289 B1 | 1/2002 | Hunter et al. | |
| 6,438,100 B1 | 8/2002 | Halpern et al. | |

(Continued)

FOREIGN PATENT DOCUMENTS
WO WO 01/43329 A 6/2001
(Continued)

OTHER PUBLICATIONS

Technical Comittee: "Lan Emulation Over ATM Version 2—LUNI Specification" The ATM Forum, Online! No. AT-LANE-0084.00, Jul. 1997 XP002353286 CA, USA.

(Continued)

Primary Examiner — Ayaz Sheikh
Assistant Examiner — Hoang-Chuong Vu

(57) ABSTRACT

A virtual network has virtual machines on physical devices connected to network interfaces each coupled by tunnels (100) through a forwarding network (40), each interface having a forwarding address in an address space of the forwarding network, each network interface having a reconfigurable address mapper (320) for determining a forwarding address for a packet, and encapsulating the packet with its forwarding address so that the forwarding network can deliver the data packet to the remote physical device having that forwarding address. Such encapsulation enables virtual machines on different physical devices to communicate transparently to the underlying forwarding network. Virtual networks can be created to suit their applications yet use or share existing forwarding networks, while protecting the forwarding network from interference by the virtual machines, and maintaining isolation between virtual machines.

17 Claims, 15 Drawing Sheets

U.S. PATENT DOCUMENTS

| | | | |
|---|---|---|---|
| 6,571,274 B1* | 5/2003 | Jacobs et al. | 709/203 |
| 6,640,251 B1 | 10/2003 | Wiget et al. | |
| 6,757,281 B1 | 6/2004 | Irish | |
| 6,789,118 B1 | 9/2004 | Rao | |
| 6,826,158 B2 | 11/2004 | Seaman et al. | |
| 7,009,968 B2 | 3/2006 | Ambe et al. | |
| 7,111,303 B2 | 9/2006 | Macchiano et al. | |
| 7,245,627 B2 | 7/2007 | Goldenberg et al. | |
| 7,281,038 B1* | 10/2007 | Salkewicz | 709/223 |
| 7,478,173 B1* | 1/2009 | Delco | 709/250 |
| 7,492,787 B2* | 2/2009 | Ji et al. | 370/466 |
| 7,549,167 B1* | 6/2009 | Huang et al. | 726/23 |
| 7,577,959 B2* | 8/2009 | Nguyen et al. | 718/105 |
| 7,583,665 B1 | 9/2009 | Duncan | |
| 7,814,228 B2 | 10/2010 | Caronni et al. | |
| 2001/0054116 A1* | 12/2001 | Cheng | 709/250 |
| 2002/0069278 A1 | 6/2002 | Forsloew | |
| 2002/0069369 A1* | 6/2002 | Tremain | 713/201 |
| 2003/0041141 A1 | 2/2003 | Abdelaziz et al. | |
| 2003/0115354 A1* | 6/2003 | Schmidt et al. | 709/232 |
| 2004/0015966 A1 | 1/2004 | MacChiano | |
| 2004/0037260 A1* | 2/2004 | Kakemizu et al. | 370/338 |
| 2004/0107261 A1* | 6/2004 | Donzis et al. | 709/207 |
| 2004/0162914 A1 | 8/2004 | St. Pierre et al. | |
| 2004/0162915 A1 | 8/2004 | Caronni et al. | |
| 2004/0174887 A1* | 9/2004 | Lee | 370/395.53 |
| 2004/0184408 A1 | 9/2004 | Liu et al. | |
| 2004/0202185 A1 | 10/2004 | Ratcliff et al. | |
| 2005/0039180 A1* | 2/2005 | Fultheim et al. | 718/1 |
| 2005/0071446 A1 | 3/2005 | Graham et al. | |
| 2005/0129040 A1 | 6/2005 | Kiel et al. | |
| 2005/0207421 A1* | 9/2005 | Suzuki | 370/392 |
| 2006/0126644 A1* | 6/2006 | Akahane et al. | 370/395.53 |
| 2007/0050520 A1* | 3/2007 | Riley | 709/239 |
| 2007/0098006 A1 | 5/2007 | Parry | |
| 2007/0195794 A1 | 8/2007 | Fujita et al. | |
| 2008/0098472 A1 | 4/2008 | Enomoto et al. | |
| 2008/0144635 A1* | 6/2008 | Carollo et al. | 370/397 |
| 2009/0125904 A1* | 5/2009 | Nelson | 718/1 |

FOREIGN PATENT DOCUMENTS

WO     WO 0143329 A2 *   6/2001

OTHER PUBLICATIONS

Huang Z et al: "A Java networking API for ATM networks" Technology of Object-Oriented Languages and Systems, 1999 . . . XP010354357.

Final Office Action dated May 25, 2010, U.S. Appl. No. 11/575,397, filed Jan. 8, 2008.

GB Search Report issued on GB Patent No. 0420664.5, GB Intellectual Property Office, Feb. 7, 2005.

Hibler, et al, "Feedback-directed Virtualization U Techniques for Scalable Network Experimentation", University of Utah Flux Group Technical Note, FTC-2004-02, May 2004, p. 1-14.

Hinden, R., "Virtual Router Redundancy Protocol", RFC 3768, Apr. 2004, pp. 1-27.

International Search Report and Written issued on PCT/EP2005/053800, European Patent Office, Dec. 12, 2005.

International Search Report and Written Opinion issued on PCT Patent Application No. PCT/EP2005/053803, European Patent Office, Nov. 8, 2005.

Kayssi, A., et al; "EmuNET: A Real Time Network Emulator, 2004 Symposium on Applied Computing", Mar. 17, 2004, pp. 357-362.

Office Action dated Jul. 14, 2010, U.S. Appl. No. 11/575,395, filed Sep. 23, 2008.

Office Action dated Mar. 24, 2010, U.S. Appl. No. 11/575,382, filed Aug. 20, 2007.

Office Action dated Mar. 3, 2010, U.S. Appl. No. 11/575,395, filed Sep. 23, 2008.

Office Action dated Oct. 7, 2009, U.S. Appl. No. 11/575,397, filed on Jan. 8, 2008.

Office Action dated Sep. 18, 2009, U.S. Appl. No. 11/575,395, filed Sep. 23, 2008.

Senevirathne, T., "Virtual Private LAN service Solution using GRE based IP Tunnels", IETF Draft draft-tesenevir-gre-vpls-OO, Feb. 2002, pp. 1-8.

* cited by examiner

NETWORK VIRTUALIZATION

RELATED APPLICATIONS

The present Application is based on International Application No. PCT/EP2005/053800 filed on Aug. 3, 2005, which in turn corresponds to GB Application No. 0420664.5 filed Sep. 17, 2004, and priority is hereby claimed under 35 USC §119 based on these applications. Each of these applications are hereby incorporated by reference in their entirety into the present application. This application relates to co-pending applications U.S. Ser. No. 11/575,397 (entitled "Mapping Discovery for Virtual Network") and U.S. Ser. No. 11/575,395 (entitled "Virtual Network Interface") filed on the same day as the present application and which are hereby incorporated by reference by their entirety.

FIELD OF THE INVENTION

The invention relates to interfaces for virtual networks, and to computer networks having such interfaces, and to corresponding methods of sending data packets over virtual networks.

BACKGROUND

In most physical IT infrastructure, resource utilization is very low: 15% is not an uncommon utilization for a server, 5% for a desktop. This means that customers have purchased far more IT infrastructure than they need, and this encourages sharing of such physical infrastructure resources to save costs. A known example is VLANs (Virtual Local Area Network). Another example is use of spare compute cycles on desktops and servers to perform large scale computations: grid applications. These examples require isolation of the network traffic, the data storage and processing of these computations from other tasks using the same infrastructure, to avoid undesirable interference between tasks. A VLAN involves physically connected ports grouped together by network hardware that supports VLANs. These VLANs are each treated as completely separate entities, and can only be joined together by a router. In other words it is a network of computers that behave as if they are connected to the same wire even though they may actually be physically located on different segments of a LAN. VLANs are configured through software rather than hardware, which means that when a computer is physically moved to another location, it can stay on the same VLAN without any hardware reconfiguration.

It is also known to provide a VPN (Virtual private network) which can be defined as a network of secure links over a public IP infrastructure. Technologies that fit in this category included Point-to-Point Tunneling Protocol, Layer 2 tunneling protocol and IP Security.

Overlay networks are known, created on top of physical network infrastructure, and make it easier to change the network configuration, abstracting devices from the configuration of the real network. Overlay networks are discussed in the literature, for example see:

Dynamic Internet Overlay Deployment and Management Using the X-Bone., Joe Touch, Computer Networks, July 2001, pp 117-135;

Violin: Virtual Internetworking on Overlay Infrastructure, X. Jiang, D. Xu, Purdue University Department of Computer Science, CS Technical Report CSD TR 03-027, Purdue University, July 2003.

These approaches operate at the Internet Protocol (IP) level, layer 3, tunneling IP inside IP and configuring routing to build their overlays.

Virtual machine technology is a known mechanism to run operating system instances on one physical machine independently of other operating system instances. It is known, within a single physical machine, to have two virtual machines connected by a virtual network on this machine. VMware is a known example of virtual machine technology, and can provide isolated environments for different operating system instances running on the same physical machine. However, each operating system instance running under VMware will see the same networking environment, in other words, the same single infrastructure configuration (where infrastructure means arrangement of processing, storage and network resources). A virtual network of virtual machines on the same physical node can be done by VMWare, by having a virtual LAN switch with ports on the single physical node. Virtual machines on different physical machines are coupled using the physical network. The terms "virtual network" and "virtual machine" are used here, in their usual sense, to mean a network or machine which is a software entity or entities with some independence from an underlying real or physical machine or real or physical network links, and is used where there is a level of indirection, or some mediation between the resource user and the physical resource. For example a virtual machine can typically be moved from one physical machine to another without changing its identity, and a virtual network can have a topology or address map which differs from that of a physical network or networks which are used by the virtual network.

SUMMARY OF THE INVENTION

A first aspect of the invention provides a network interface for a first physical device for sending a data packet from a local virtual machine on the first physical device to at least one other virtual machine on at least one remote physical device, coupled by a forwarding network, the data packets having a destination address of the other virtual machine in an address space of a virtual network, independent of an address space of the forwarding network. The network interface has a connection to each of the local virtual machines, and has an address mapper arranged to determine a corresponding forwarding address in an address space of the forwarding network, using the destination address of each data packet. The interface encapsulates the data packet with the forwarding address so that the forwarding network can deliver the data packet to the remote physical device having that forwarding address.

Other aspects of the invention include corresponding computer networks, methods of sending packets over such networks, and corresponding computer programs. Additional features can be combined together, and combined with any of the aspects, as would be apparent to those skilled in the art. The embodiments are examples only, the scope is not limited by these examples, and many other examples can be conceived within the scope of the claims.

BRIEF DESCRIPTION OF THE FIGURES

Specific embodiments of the invention will now be described, by way of example, with reference to the accompanying Figures, in which.

DETAILED DESCRIPTION

The embodiments described provide ways to implement transparent and secure ISO layer-two network virtualization. Virtual networks that are completely decoupled from the underlying network topology, give their users the illusion that they have their own network in which they can run any network services and use any addressing scheme without interference with the physical network. Virtual networks are constructed out of virtual LAN segments (vnets), which operate at network layer 2, transporting Ethernet frames. Such vnets are implemented in software, which operates at the vnet endpoints and hence does not require the modification or configuration of the underlying network or network services such as routers. One application area for such vnets is to provide network virtualization for virtual machines, allowing the construction of non-interfering and secure virtual systems, comprising virtual machines coupled by such vnets.

In attempting to use virtual machines to build computing systems, one of the problems is that current virtual machine technology does not virtualize the network. If a virtual machine needs to communicate with a virtual machine that is not hosted on the same physical machine it must use a forwarding network to do so. This forwarding network can be a physical network or another virtual network which is ultimately dependent on an underlying physical network. This means that the virtual machine must have an address routable on the physical network. It also allows the virtual machine to see traffic on the physical network and allows other machines with access to the physical network to send traffic to it.

When trying to build virtual infrastructures, these properties are problematical. They make it difficult to protect infrastructure services from virtual machines, and to protect virtual machines from each other and machines on the physical network. Vnets can address these problems by isolating virtual machines inside virtual networks that are isolated from the physical network. A virtual machine on a vnet can only communicate with other network interfaces on the vnet, and not with the physical network (unless it also has a virtual interface exposed to the physical network). Vnets can enforce security using IPSEC for example to encapsulate traffic, hiding the traffic from unauthorised observers on the physical network and preventing unauthorised access to vnets.

Figure 1:
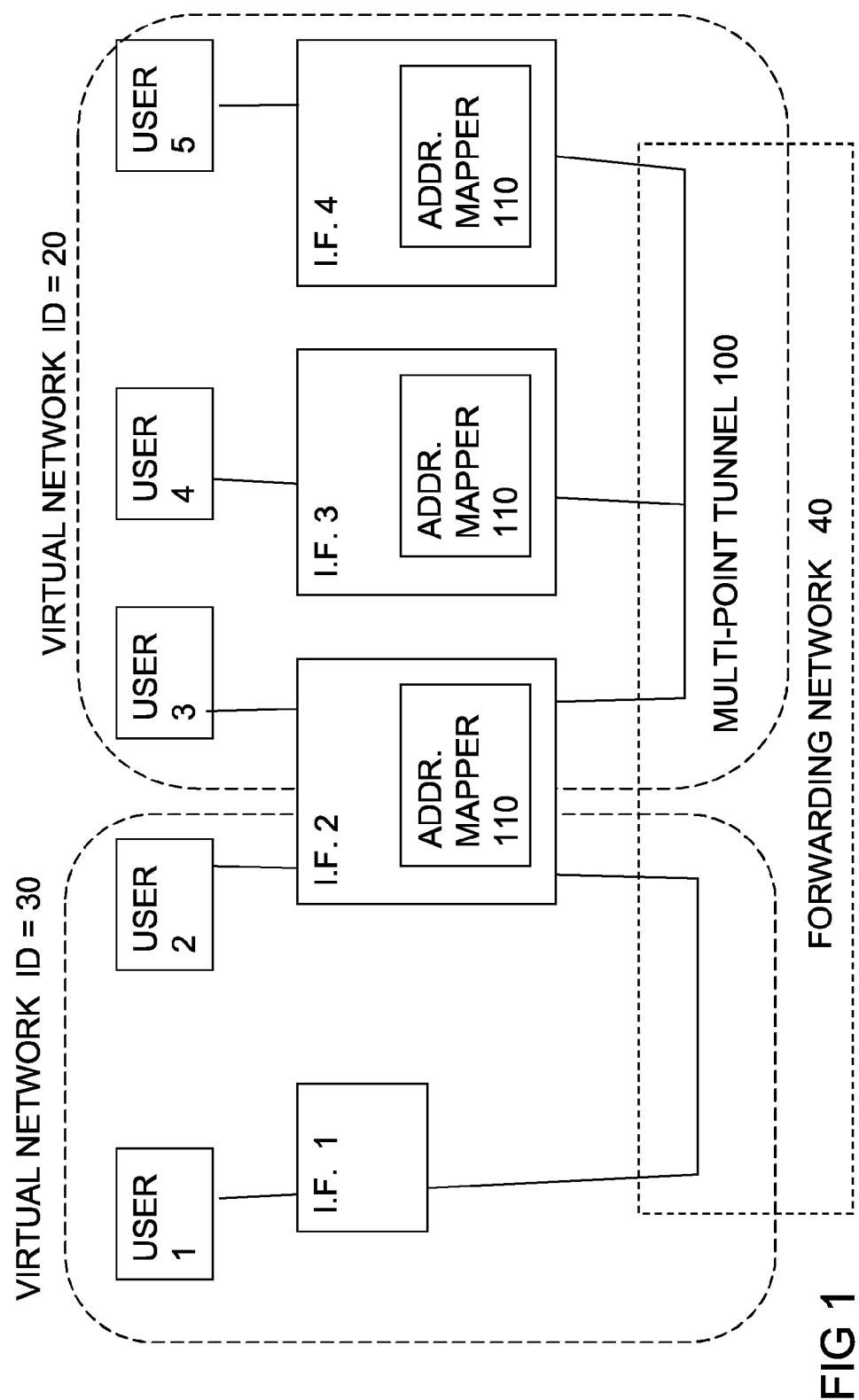
FIG. 1 shows a schematic view of virtual networks and a forwarding network according to an embodiment.

FIG. 1, Network View

FIG. 1 shows an example with two virtual networks, making use of a forwarding network 40. A first of the virtual networks has ID=30 and has users 1 and 2 coupled to interfaces I.F.1 and I.F.2 respectively. Packets between user 1 and user2 are tunnelled across the forwarding network by the interfaces. A second of the virtual networks has ID=20 and users 3 to 5 are coupled by interfaces 2 to 4 respectively. These interfaces are coupled by a multipoint tunnel 100 created by address mappers 110 in each of the interfaces. A tunnel is created by encapsulation of packets which are then transmitted to a far end of the tunnel as defined by the encapsulation, without reference to the packet inside the encapsulation. At the far end of the tunnel, the packet is decapsulated, and may continue to an ultimate destination defined by the packet itself. A multipoint tunnel occurs where the encapsulation process can select from more than one far end for a given packet.

As shown, each interface can support one or many users, and each interface may be connected to one or more virtual networks. The forwarding network can be implemented by a real network such as an IP network, or may be for example another virtual network which ultimately uses a real network. An example of the interfaces is described in more detail below with reference to FIG. 3. An example of the address mapper is described in more detail with respect to FIG. 4. A process of sending a packet will be described below with reference to FIG. 5.

Figure 2:
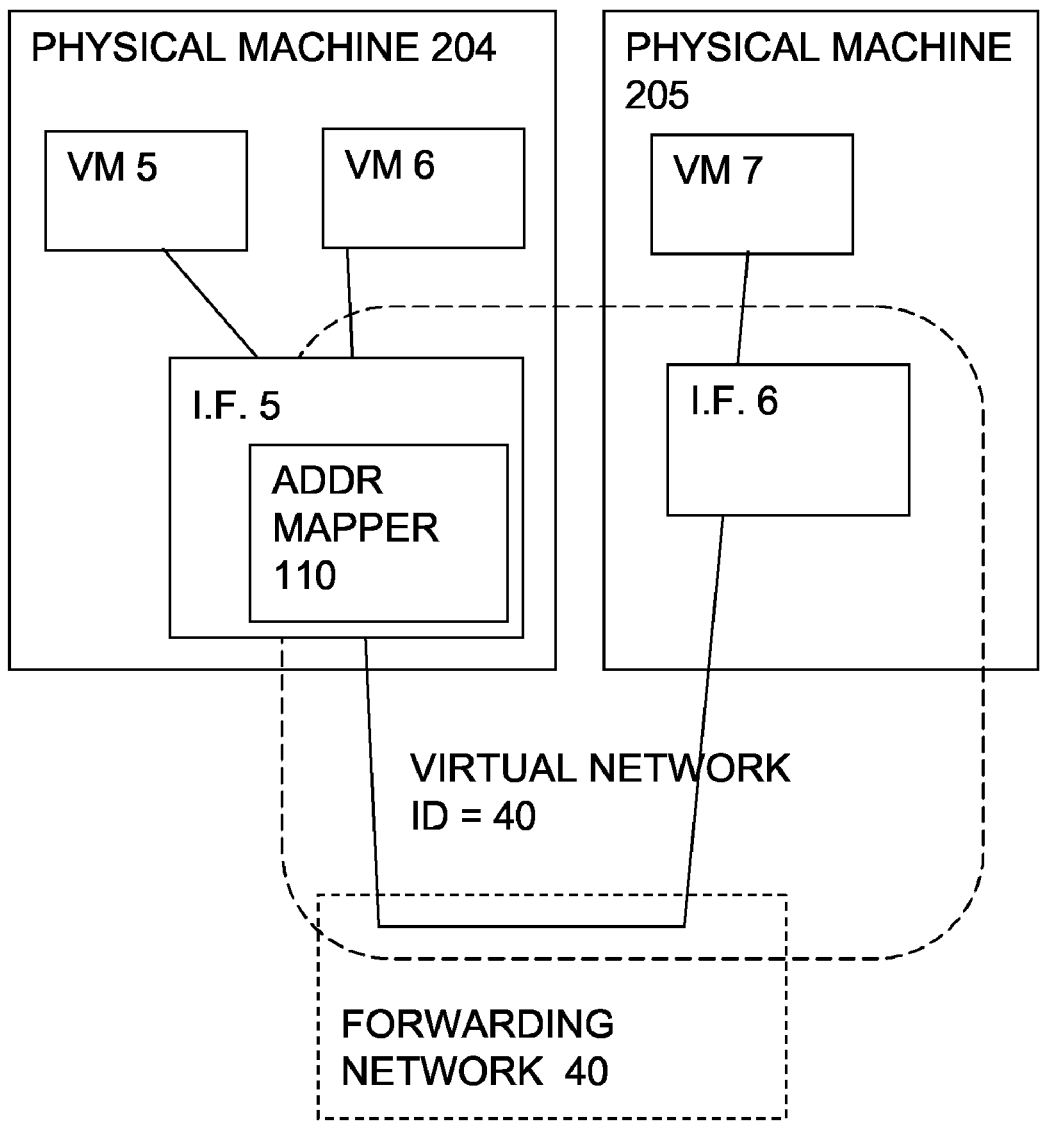
FIG. 2 shows a schematic view of a virtual network and physical machines according to an embodiment.

FIG. 2, Overview Showing Physical Machines

FIG. 2 shows another example with physical machines 204 and 205 coupled by a virtual network (ID=40) which uses forwarding network 40. Virtual machines VM5 and VM6 are hosted by physical machine 204, and coupled to the virtual network by interface I.F.5. Virtual machine VM7 is hosted by physical machine 205 and uses interface I.F.6 for access to the virtual network.

Figure 3:
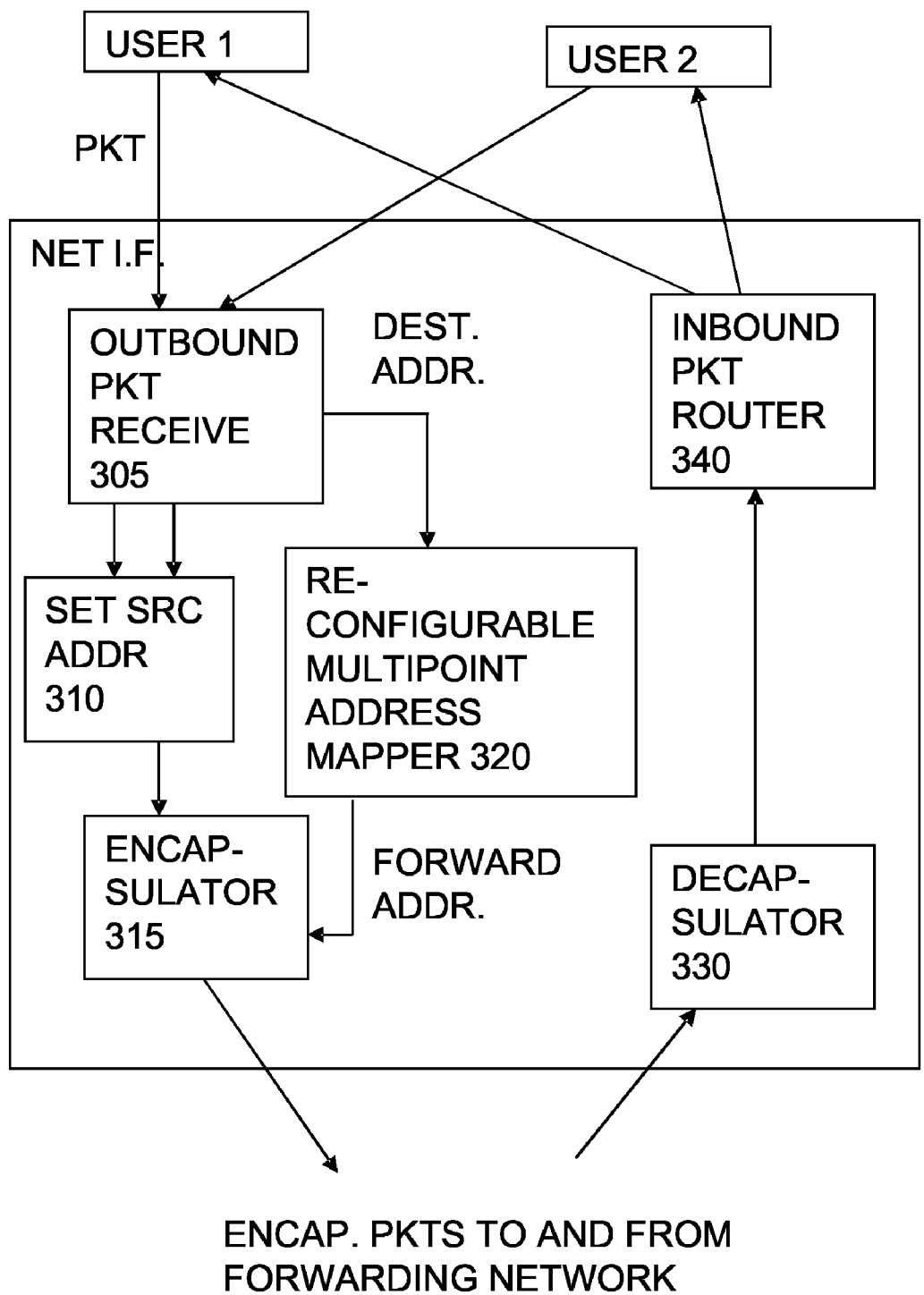
FIG. 3 shows a schematic view of an interface for the virtual networks, according to an embodiment.

FIG. 3, View of Network Interface

FIG. 3 shows an example of an interface for use in the embodiments shown in FIG. 1 or 2 or in other embodiments. Other implementations are possible. The interface has a part 305 for receiving packets from users. The destination address is extracted and sent to an address mapper 320, in this case a reconfigurable multipoint address mapper. Optionally a part 310 is capable of setting the source address, so that users cannot obtain illegal access by pretending to be another user by providing a false source address. The address mapper provides a forwarding address to an encapsulator 315, which can send encapsulated packets over the forwarding network. The interface also has a decapsulator 330 for receiving and decapsulating inbound packets from the forwarding network. These are fed to a router 340 which sends them to the appropriate user according to the destination address in the packet.

Figure 4:
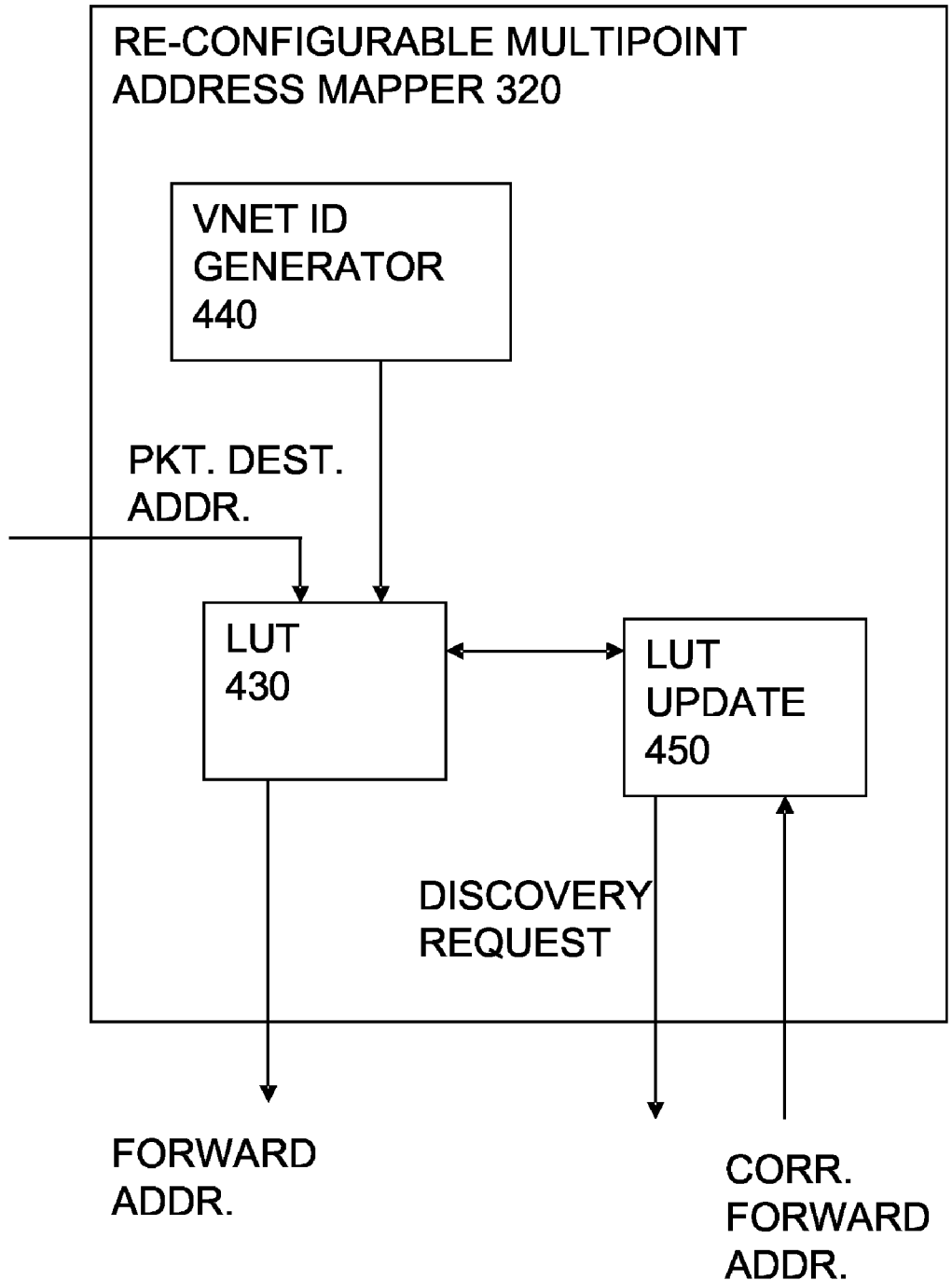
FIG. 4 shows a schematic view of a re-configurable multipoint address mapper, according to an embodiment.

FIG. 4, View of Address Mapper

FIG. 4 shows an example of a reconfigurable multipoint address mapper 320 for use in the embodiment of FIG. 3 or other embodiments. A look up table LUT 430 is provided to enable a forwarding address to be looked up, based on a destination address, and optionally also based on virtual network (vnet) ID. This ID is optionally obtained from the user, or alternatively obtained independently of the user by part 440, so that the user cannot present a false ID. This can be determined according to which of several input paths the packet is received from for example. An LUT update part 450 is provided to maintain the mappings of the address mapper up to date, or to configure them at the outset. This part initiates a discovery request and receives corresponding forwarding addresses from other interfaces or from a centralised management function for example, or from both. This part may act when needed, or may periodically check if an entry in the LUT is empty or time expired, to keep the mapper up to date to a desired standard.

Figure 5:
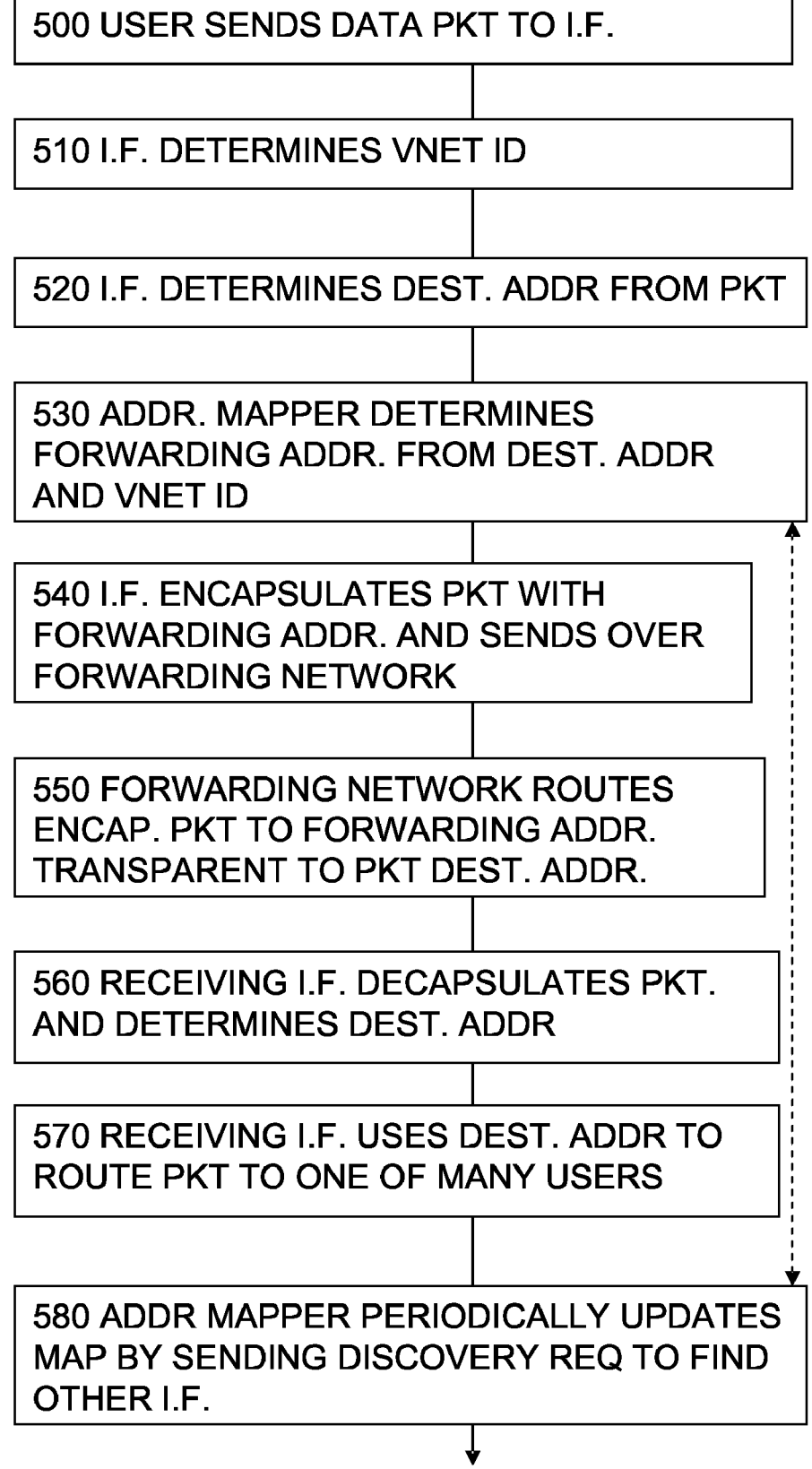
FIG. 5 shows a sequence of steps for sending a packet according to an embodiment.

FIG. 5, View of Packet Sending Process

At step 500, a user sends a data packet to its interface. At steps 510, and 520, the interface determines the vnet ID, and determines the destination address from the packet. At step 530, the address mapper determines the forwarding address, which is then used in encapsulation step 540. A dotted line is shown from step 530 to step 580 where the address mapper is updated. This step can be used if the address mapper does not have a forwarding address or if its forwarding address is out of date for example. Optionally the vnet ID is also encapsulated or in the encapsulation so that the forwarding network can use it if desired. The forwarding network routes the encapsulated packet to the forwarding address transparently to the destination address hidden inside the encapsulation, at step 550. At step 560, the receiving interface receives the encapsulated packet and decapsulates it. The destination address is revealed and used by the receiving interface to route the packet to one of many users as appropriate, at step 570. Independently of this process, at step 580, the address mapper may periodically update its map in its LUT by sending a discovery request, described in more detail below with reference to FIG. 13.

If the forwarding network is an IP network, the forwarding address will be an IP address. If a node of the IP network does not recognise the IP address and cannot resolve a hardware address in the underlying hardware network to send it to, it would typically invoke an ARP, address resolution protocol to try to discover a corresponding hardware address. This involves flooding the network with discovery messages.

Figure 6:
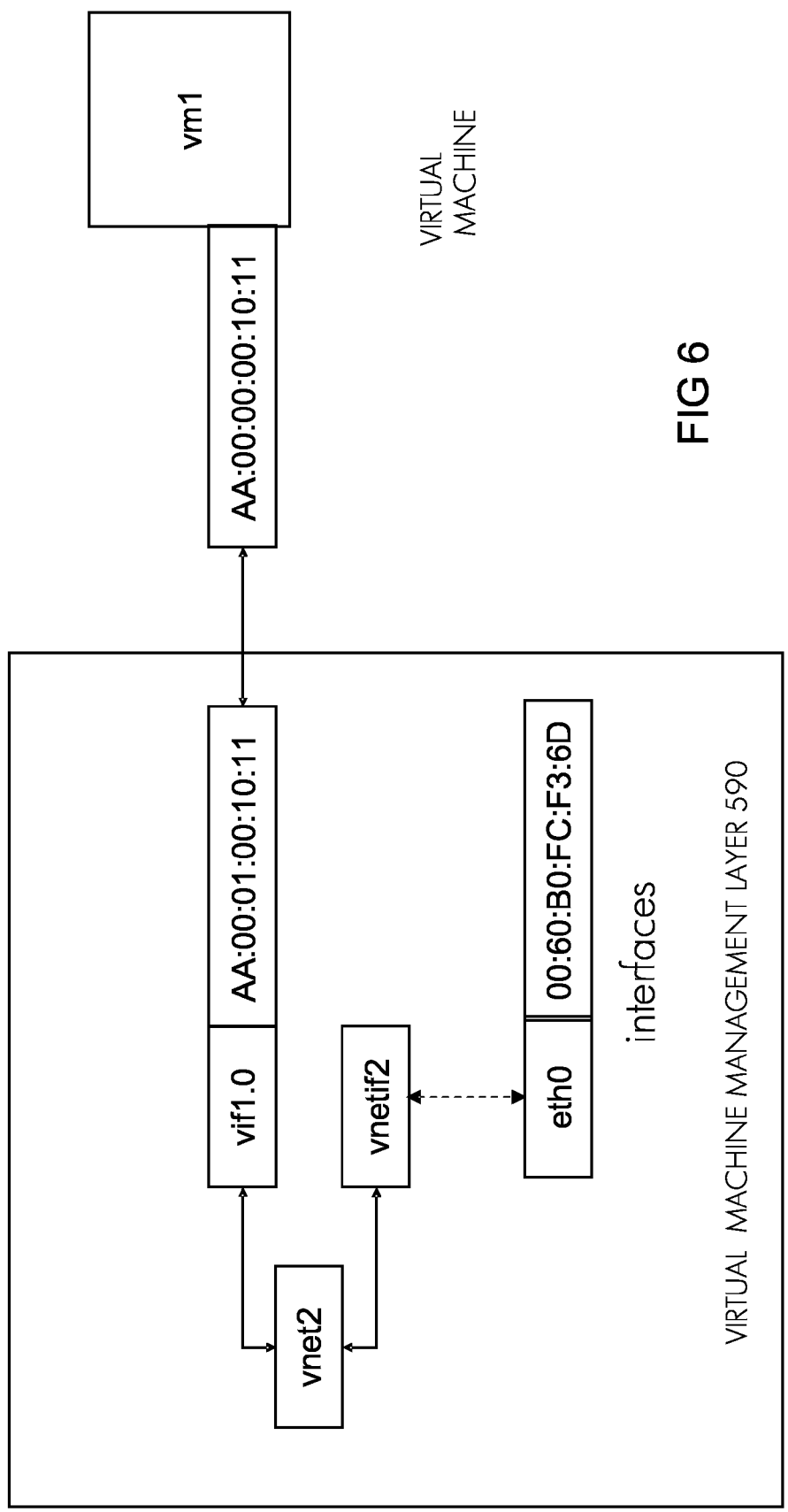
FIG. 6 shows in schematic form a virtual machine management layer.
Figure 7:
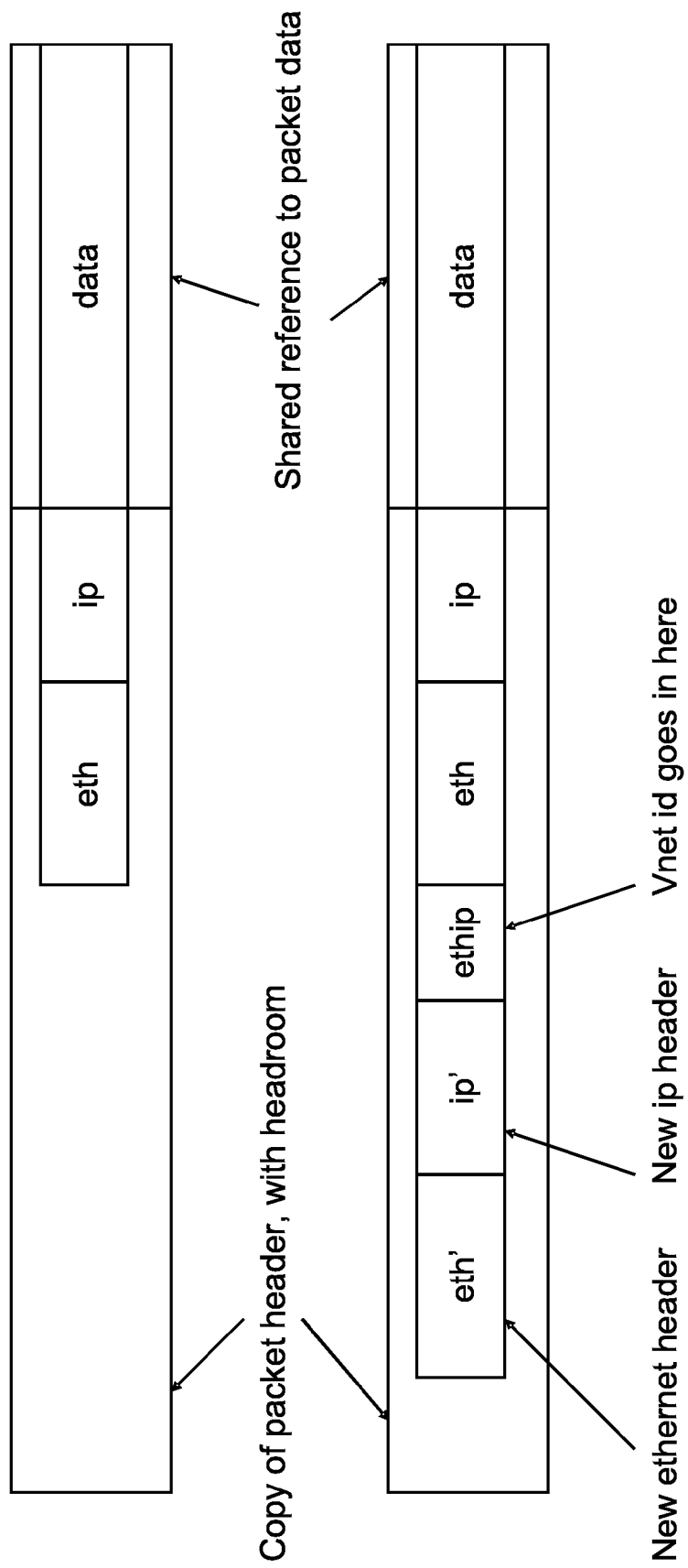
FIGS. 7 and 8 show in packet formats in schematic form.
Figure 8:
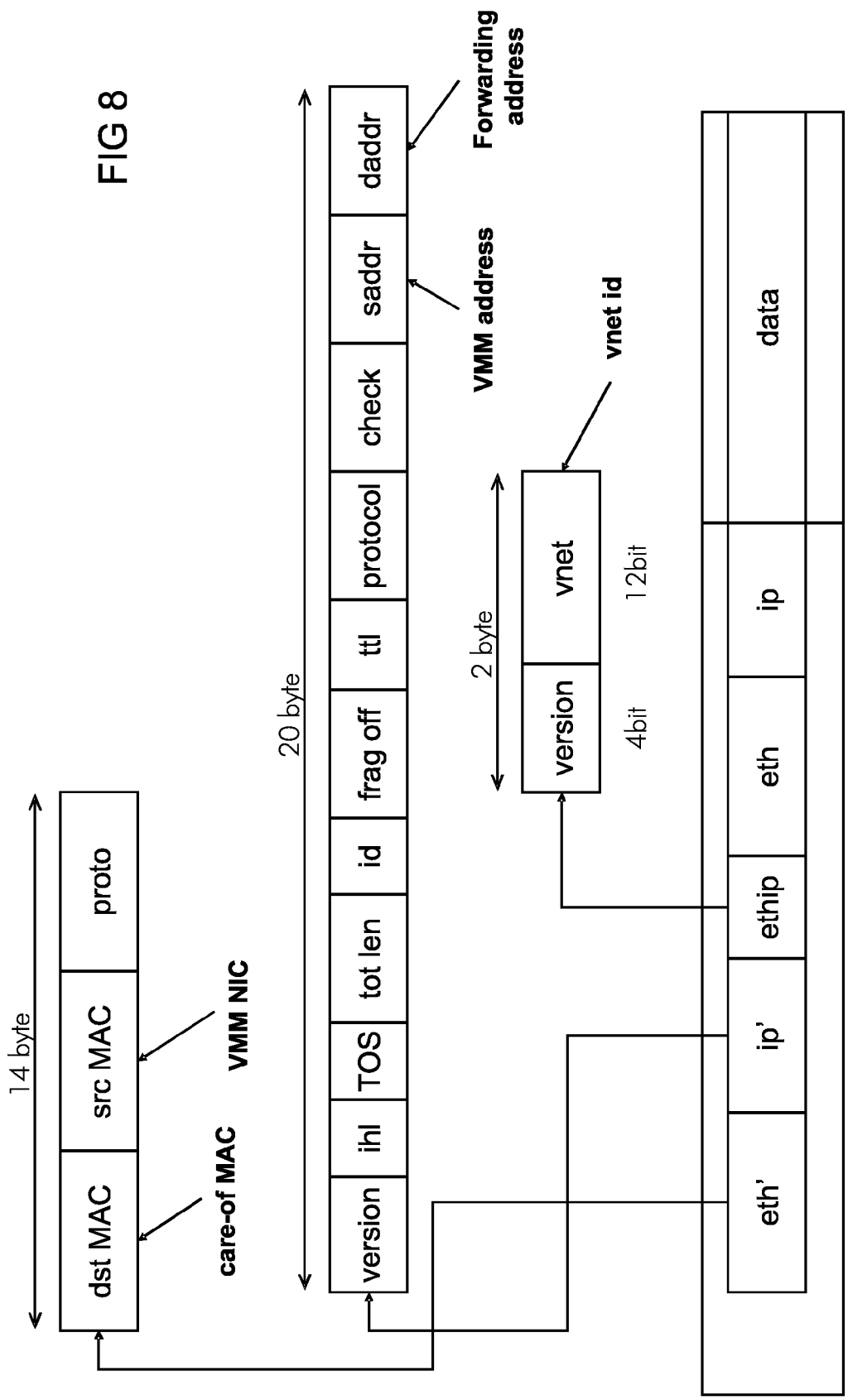

FIGS. 6-8, Address Mapping and Encapsulation to Create Tunnels

FIG. 6 shows a virtual machine vm1 and a representation of some of the software entities in a virtual machine management layer 590. This layer includes interfaces and a bridge between the interfaces. Interface vif1.0 represents a software interface to vm1. It can be arranged, if desired, so that all packets going to or from vm1 must pass through this interface. The interface has its own address, in this example AA:00:01:00:10:11. Another interface vnetif2 is provided for passing packets to and from other parts of the management layer. There may be many other virtual machines, each with their own interface. Bridges may be provided between interfaces, one is shown, vnet2, coupling interfaces vif1.0 and vnetif2. Packets passing to and from the forwarding network will use another entity, eth0. Eth0 is a software interface in the form of a driver for a network interface card, and is coupled directly or indirectly to vnetif2.

Vnets can be built using multipoint tunnels. Where Ethernet is used, an Ethernet frame sent to a given vnet is encapsulated in a new IP frame. In one example of such encapsulation, the data packet received from the user is an Ethernet frame which already encapsulates an IP header and the payload data as shown in FIG. 7. The Etherip header can be used for this further encapsulation purpose (RFC 3378), which involves adding the Etherip protocol identifier, then the vnet id in front of the original Ethernet frame. As the Etherip header defined in the RFC does not have enough space the header can be expanded to allow space for 32-bit vnet ids. The use of the Etherip protocol number is merely a convenience to give us a free protocol id which can be used without fear of conflict.

FIG. 8 shows more detail of the component parts of the encapsulation. The ethip part includes a 4 bit version and a 12 bit vnet id. The 20 byte IP' part includes the following fields, which are described in more detail in publication by the IETF, ("Internet Protocol, DARPA Internet Progam Procotol Specification", IETF RFC 791, DARPA 1981): version, ihl, TOS, tot len, id, frag off, ttl, protocol, check, source addr in the form of an address of the user, such as a virtual machine monitor (vmm) address, and daddr, in the form of the forwarding address.

Once the Ethernet frame has been encapsulated as shown in the lower half of FIG. 7, it is sent to the forwarding network in the normal way. As addressing in the virtual network is independent of the addressing in the physical network, (or any forwarding network) the address mapper uses a stored mapping in the form of a table for example mapping the vnet id and destination virtual MAC address to a routable IP address, the care-of address. How this table is configured, to fill it at the outset and maintain it up to date is described in more detail below. An outbound unicast frame is sent to the care-of address from the table. An outbound broadcast or multicast frame is sent to the vnet multicast address, which is a configured multicast address used by the vnet implementation.

Figure 15:
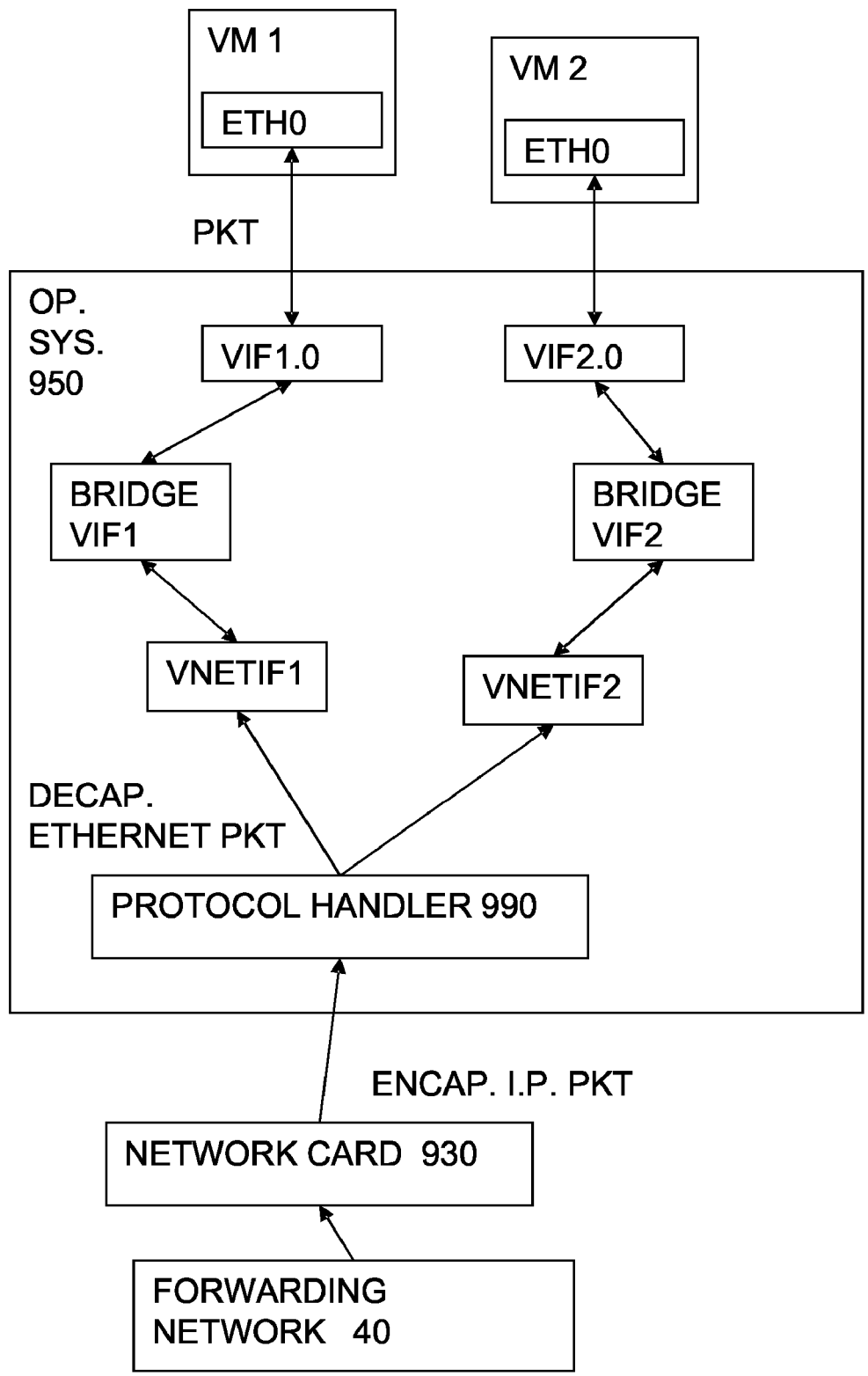
FIG. 15 shows an implementation of an interface to a forwarding network, using an operating system.

Inbound encapsulated frames are passed to a protocol handler which extracts the vnet id from the header, removes the header and delivers the contained Ethernet frame to an incoming interface associated with the vnet. In one implementation, using the known operating system Linux, each vnet has a Linux virtual interface which is used to perform the outbound encapsulation of Ethernet frames, and from which inbound decapsulated frames are received. Client interfaces are connected to vnets using the bridge facilities in the Linux kernel, as shown in FIG. 15.

Security:

When using vnets for virtual machines, each virtual machine network interface has a corresponding virtual interface in a privileged Linux instance having access to the physical network, and these virtual interfaces are connected to their vnets using bridges. The Ethernet encapsulation decouples the vnet traffic from the physical network, while the inbound and outbound processing prevents vnet crosstalk.

However this means the vnet traffic is still transmitted in clear on the network. When security is desired the known IPSEC Encapsulated Security Payload (ESP) transform or other known security measures can be used to provide message authentication and security and prevent vnet snooping and spoofing for example. IPSEC (ESP) can provide message integrity and optional confidentiality. Network domain kernel is the policy enforcement point: it applies security transforms but does not negotiate the Security Associations (SAs). To negotiate SAs a key daemon in user space can be used for example. The user can talk to it over a socket, just as the Linux kernel does, or an existing IKE (Internet Key Exchange) daemon (e.g. Racoon, Pluto) can be used. This may imply packet queuing while SAs are negotiated, which needs storage resources.

In a practical example, the interface could implement vnet security as follows. For an outbound packet it determines a security level required from the COA and VNET id, then applies a relevant transform and sends it to network. For an inbound packet for ESP it looks up the SA and processes it, then sets the packet security context. For an inbound packet for Etherip only, it accepts it if it meets the security policy for that vnet, identifying the vnet from the Etherip header. After processing it routes the data packet to vifs on same vnet by Ethernet bridging for example.

Multicast

As unicast frames are encapsulated in unicast IP packets, they can traverse arbitrary network topology to reach the endpoint. Frames encapsulated in multicast IP packets will reach the local LAN segment, but will only go further if IP multicast support has been configured in the network routers. As this is not typically done, an alternative is to use daemons, which are discrete bundles of software code running at a given location, for a given purpose, following established principles. A first daemon, (vnetd), is used to tunnel multicast packets on the vnet multicast address to peer daemons on remote LAN segments, where they are re-transmitted. This allows vnets to span arbitrary network topology.

As described above, vnets can appear to provide virtual LAN segments to their users that behave to all intents and purposes as if they were hardware LANs. Vnet users can have complete control over the services they run and the addressing scheme they use, with no danger of interfering with the underlying physical network. Multiple vnets can be run on the same physical network without interfering with each other, and vnets can be secured using IPSEC if desired. Vnets are completely independent of the physical network: a vnet can span multiple physical LAN segments and cross routers. No router reconfiguration is required to support such vnets. Vnets can be implemented completely in software and no specialised hardware is required, thus making maintenance and scalability more straightforward.

As described, giving users the illusion they have their own virtual private LAN means they are able to use arbitrary IP addresses, able to use arbitrary MAC addresses, and their operations are transparent to the forwarding network and all network services. This in turn means that multiple virtual networks can be used, each isolated from others, meaning security can be at least as good as a hardware VLAN. Further it is possible to maintain connectivity when users migrate and to decouple virtual LANs from the forwarding network structure. This means it supports multi-homed users, including interfaces onto the forwarding network.

Implementation with Virtual Machines (VMs) as Users

The virtual networks can be created out of virtual private LAN segments, known as VNETs. A single vnet behaves like a LAN segment in that broadcast traffic covers the whole vnet. Virtual networks can be built from of multiple vnets, using routers with interfaces on more than one vnet to connect them (as is done with real networks). VM network interfaces (vifs) can be labelled with a VNET id at creation time. VNET id 1 is reserved for the physical network. The Ethernet frames coming from vifs are encapsulated in IP packets. Traffic on VNET 1 (physical) is not encapsulated. The encapsulated packets keep the vif MAC (so they can use DHCP for example). Traffic is routed to vifs by VNET id and MAC, so that there is no cross talk between different virtual networks. As shown in the implementation view in FIG. 6 described above, each vif in a domain has a corresponding virtual interface in the driver domain.

FIGS. 9-12 Implementation of Vnets in Adaptive Infrastructure

Embodiments of virtual networks to be described below are advantageously used in a software-based adaptive IT infrastructure. An exemplary such infrastructure, termed SoftUDC, will be described briefly below with reference to FIG. 9, and embodiments of virtual networks will then be described in the context of SoftUDC.

SoftUDC attempts to provide a utility computing environment with greater flexibility and potential than a known utility data center. SoftUDC abstracts the physical infrastructure of the data center, allowing resources to be shared among disparate services, and enabling reconfiguration without rewiring. Each server within the SoftUDC runs a virtual machine monitor (VMM 930). This layer provides the abstraction of multiple virtual machines 945 running on each physical machine, to provide customer applications and guest operating systems 950. Each virtual machine sees an abstract view of its storage and network. The VMMs on different nodes can connect virtual machines into virtual farms, and ensure that the virtual farms are isolated from each other. A virtual farm then consists of a set of virtual machines, virtual networks and associated storage. An administrator has access to a SoftUDC control system spanning all the VMMs, the control system allowing the administrator to deploy services and modify virtual farms without need for physical reconfiguration of physical infrastructure. Administrative tasks such as allocating and configuring farms, deploying new applications, rebalancing loads in the system, and performing system maintenance, are automated.

Figure 9:
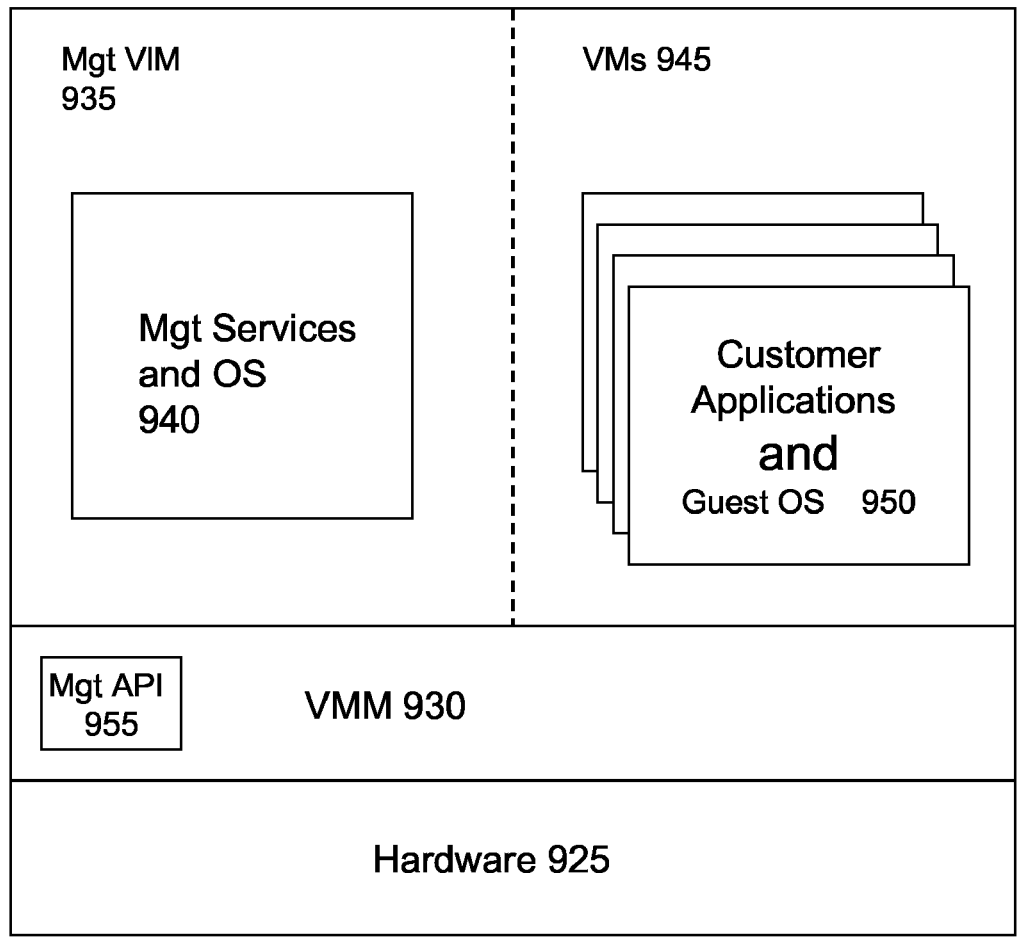
FIG. 9 shows a view of a server hosting a number of virtual machines.

The SoftUDC adds a virtualizing layer to the VMM on each server, called the gatekeeper, which specifically mediates all I/O and network traffic generated by the server. The gatekeeper enforces communications access control and provides communications security. Such a gatekeeper can be implemented in hardware, in the VMM or in the host operating system. In a preferred implementation, the Xen VMM (described in P Barham et al, "Xen and the Art of Virtualization", in Proceedings of SOSP'03, 2003) is used as the VMM and components of the gatekeeper are implemented in the VMM and the first virtual machine (which has special privileges in Xen). FIG. 9 shows an example of a SoftUDC software stack on a server, including the gatekeeper implemented by a management API (application programming interface) 955 and by a management virtual machine 935 for providing management services and an operating system 940 to the other virtual machines. Specific embodiments of virtual networks according to aspects of the invention will now be described in the context of SoftUDC. The aim of network virtualization in this context is to provide users with the impression that they have their own virtual private LAN, known as a VNET, within which they are free to use any MAC or IP addresses they want. VNETs are preferably required to provide security at least as good as that provided by a hardware VLAN. VNETs should be decoupled from the underlying network topology, and should maintain network connectivity when virtual machines migrate from one machine to another.

The virtual machine's access to networking is done by providing the virtual machine with a virtual network interface (VIF), usually appearing to be an Ethernet device. The VMM forwards outbound network packets to its physical network interface and dispatches incoming network packets to appropriate virtual network interfaces. With this implementation, virtual machines needing off-machine networking use the physical network, and their VIFs must have MAC addresses and IP addresses suitable for this. Machines on the physical network can observe virtual machine packets in transit.

As described above, VNETs are implemented by labelling a VIF with the VNET that it belongs to. Outbound Ethernet traffic destined for a VNET is encapsulated in an IP packet using Etherip and forwarded to the network. Inbound Etherip traffic is decapsulated to produce an Ethernet frame, which is delivered to VIFs on its VNET. The VNET id of a packet is stored in a field of the Etherip header for transport across the network.

Some VIFs require direct access to the physical network, and we reserve VNET id 1 for this. Traffic on VNET 1 is delivered to the network without encapsulation, and uses the VIF MAC. Encapsulated VNET traffic has to be directed to a suitable IP address, the care-of address (COA), also called the forwarding address. This is done based on the destination MAC address of the Ethernet frame and the VNET. If the MAC is a broadcast or multicast address, the COA is the local VNET multicast address (default 254.10.0.1). If the MAC is a unicast address, the COA is the real IP address of the machine hosting the addressed virtual interface. Care-of addresses for VIFs are discovered using a new protocol, the Virtual Address Resolution Protocol (VARP), described in more detail below. VARP is modelled on ARP—VARP requests are broadcast or multicast, with unicast responses. As VARP learns where VIFs are, migration does not cause it any particular difficulty. When a virtual machine migrates the care-of addresses of all its VIFs change, so we broadcast a VARP reply for all the VIFs. This updates the VARP caches of any systems communicating with it, and maintains network connectivity.

Figure 10:
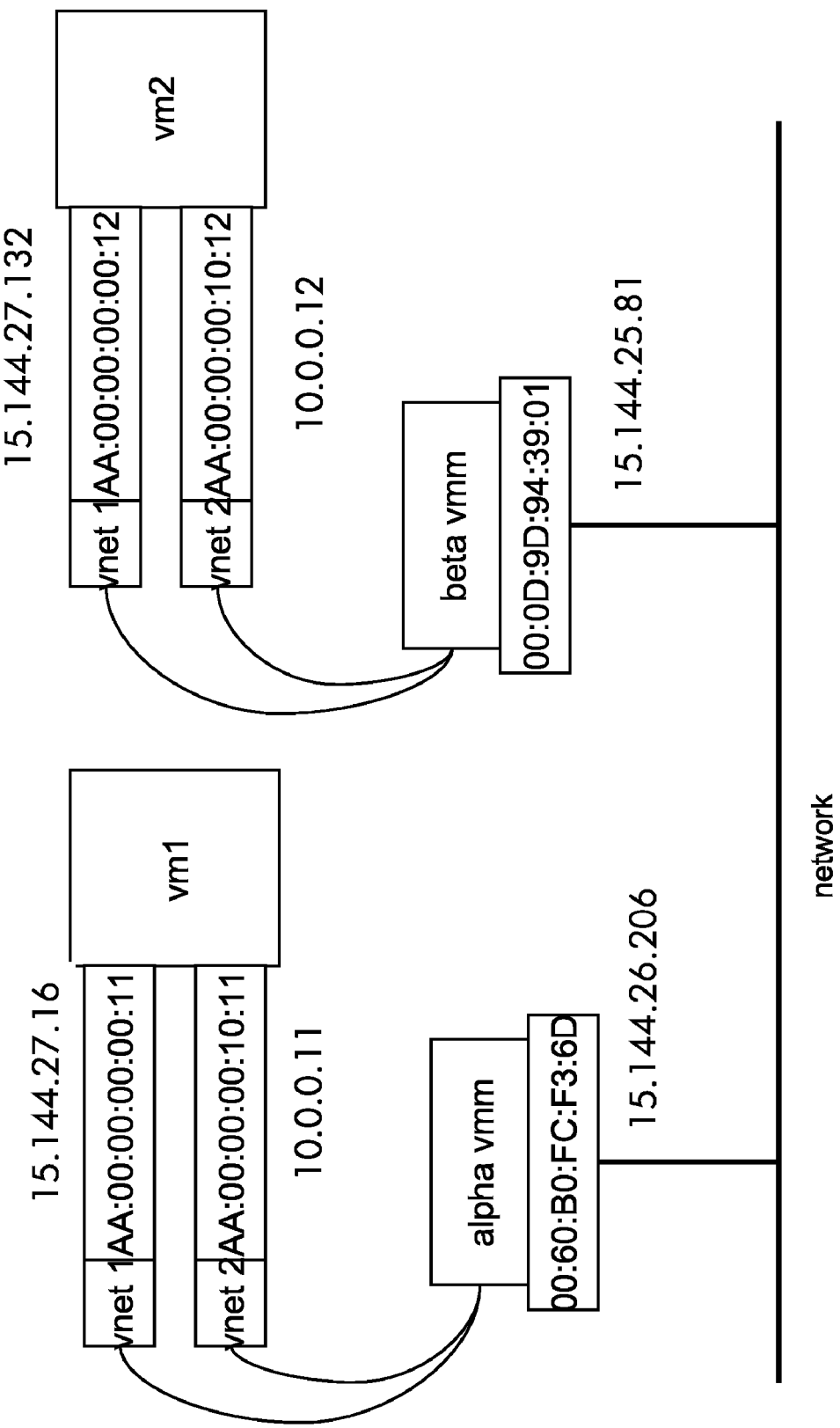
FIG. 10 shows a view of virtual machines coupled by a network.
Figure 11:
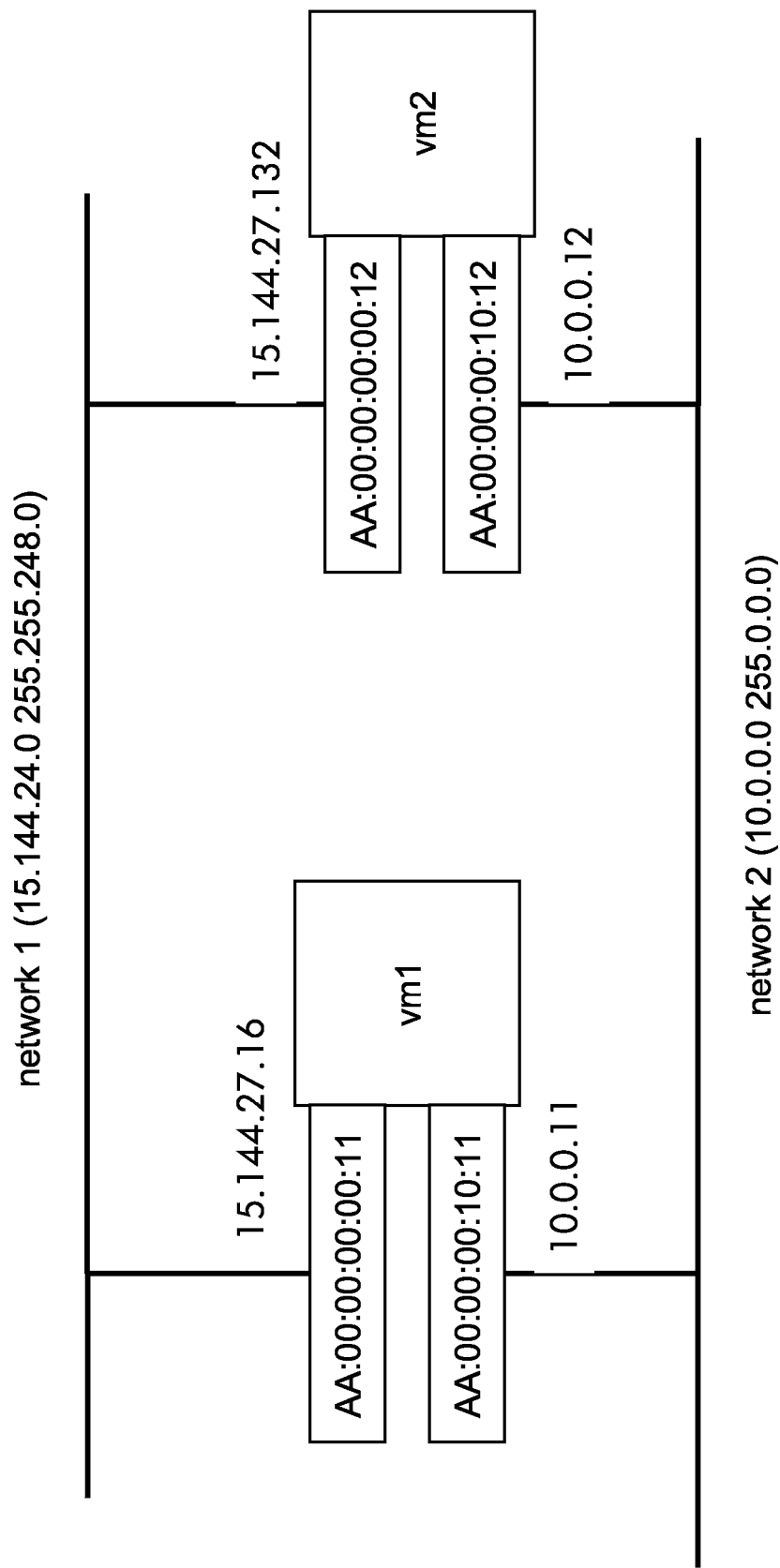
FIG. 11 shows a corresponding virtual network view.

In SoftUDC, network isolation is implemented using VNETs: the VMM encapsulates the packet and sends it to another VMM or a virtual router on the same VNET. The receiving VMM unwraps the packet and delivers it to the target. The target may consume the packet (in the case of a virtual machine), or forward it (e.g. a virtual router or dual homed virtual machine). FIGS. 10 and 11 show an example of how SoftUDC virtualizes the physical network to provide a different view to the machines in the virtual farm: FIG. 10 shows the physical network configuration and FIG. 11 the virtual network configuration for the same example. In FIG. 10, an alpha VMM and a beta VMM are running on physical servers coupled by a physical network link, and having network addresses as shown. VM 1 is running on alpha and VM 2 is running on beta. VM1 and VM2 are connected by two vnets, virtual networks, 1 and 2 shown in FIG. 11. Hence VM1 and VM2 each have two vnet addresses.

There is a need to ensure that other entities sharing the same physical network, but not part of the same virtual farm, cannot read the data in a packet or send packets to entities in that virtual farm. One approach for doing this is by optionally encapsulating Etherip packets using IPSEC Encapsulated Security Payload (ESP) in a VNET to provide message authentication and confidentiality. IPSEC encryption ensures the data cannot be read by any entity except the intended target. IPSEC authentication ensures that only entities within the virtual farm can send data, other entities attempting to authenticate will not be recognized as belonging to the virtual farm.

To prevent one virtual machine consuming all available bandwidth, the facilities in Xen to limit the bandwidth available to a virtual machine can be used. This means that SoftUDC physical machines cannot consume all available bandwidth, unless a VMM is compromised. However, it does not prevent other non-SoftUDC entities sharing the same network consuming all available bandwidth. If the latter is a concern, then non-SoftUDC entities need to be moved to a separate network.

SoftUDC also provides a virtual firewall that can be incorporated by a virtual farm administrator. The virtual firewall is an ordinary Linux based firewall running in a separate multihomed virtual machine. This allows designers to configure DMZs (where a DMZ is typically a computer or small network that sits between a trusted internal network and an untrusted external network) and exercise control over the flow of network traffic into, out of and through their virtual networks.

The SoftUDC network virtualization makes it easy to create multi-tier virtual networks. Two virtual servers can reside on the same physical machine and yet be in completely different networks. This makes it very easy to isolate sensitive virtual machines into separate networks behind virtual firewalls to make it very difficult for an attacker to access them.

Figure 12:
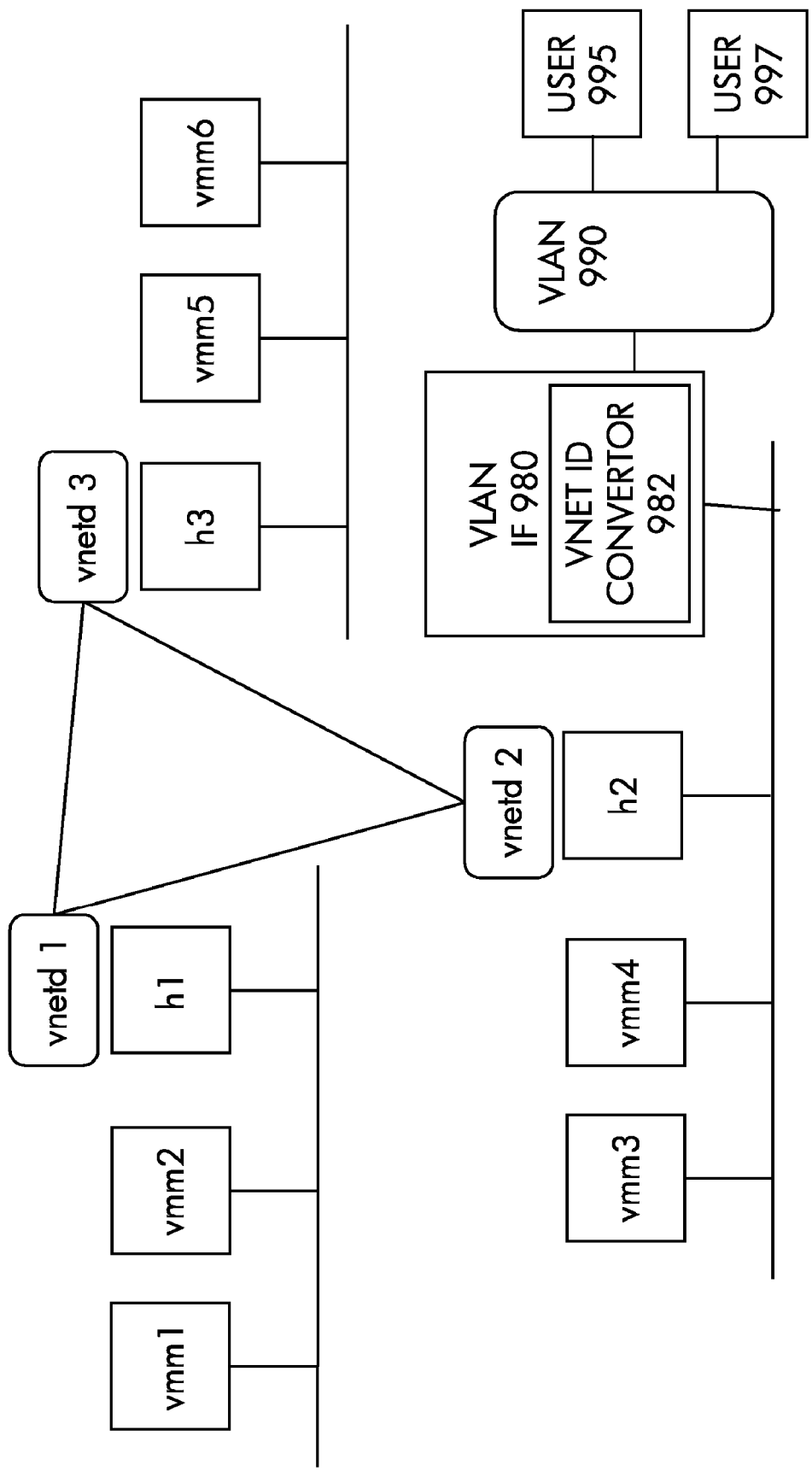
FIG. 12 shows a number of network segments coupled together.

Particular issues do arise when wide area VNETs are required. These are discussed below. VNET transport and VARP both use multicast, so VNET multicast packets will normally be restricted to the local LAN segment, and VARP will not be able to discover VIFs hosted further away. In a network supporting multicast routing, this can be remedied by routing the VNET multicast address to the relevant LANs. However, multicast routing is often not supported. Therefore a special-purpose daemon, called vnetd, is used to support wide-area VNETs. An example is shown in FIG. 12. Three physical LAN segments are shown, each having a number of VMMs 1-6 attached. One vnetd daemon is run on each LAN segment hosting VIFs, using hosts h1-h3 respectively, and each vnetd daemon is connected to all the others. Each vnetd daemon forwards local VNET multicasts to its peers, and resends forwarded multicasts locally. These daemons also forward VARP requests and replies.

The Vnetd daemons are transparent to VMMs, and encapsulated VNET traffic normally goes direct to the hosting machine, not through the vnetd daemons. This is because VARP forwarding ensures that VMMs discover the address of the hosting machine even if the VIF is remote.

FIG. 12 illustrates the general arrangements for traffic in wide area VNETs as described above, and also illustrates a VLAN interface 980. This is useful to enable one or more virtual networks to cooperate with an existing VLAN 990 for example, to reach users 995 and 997 coupled to the VLAN. The VLAN interface can be arranged to couple one vnet to many VLANs, or many vnets to one or many VLANs for example. It includes a convertor 982 to convert a vnet ID to a VLAN ID and vice versa. h1, h2 and h3 are hosts. Vnetd can run in a vm or a separate machine, anywhere where it can see the traffic and look for packets destined for other segments.

Figure 13:
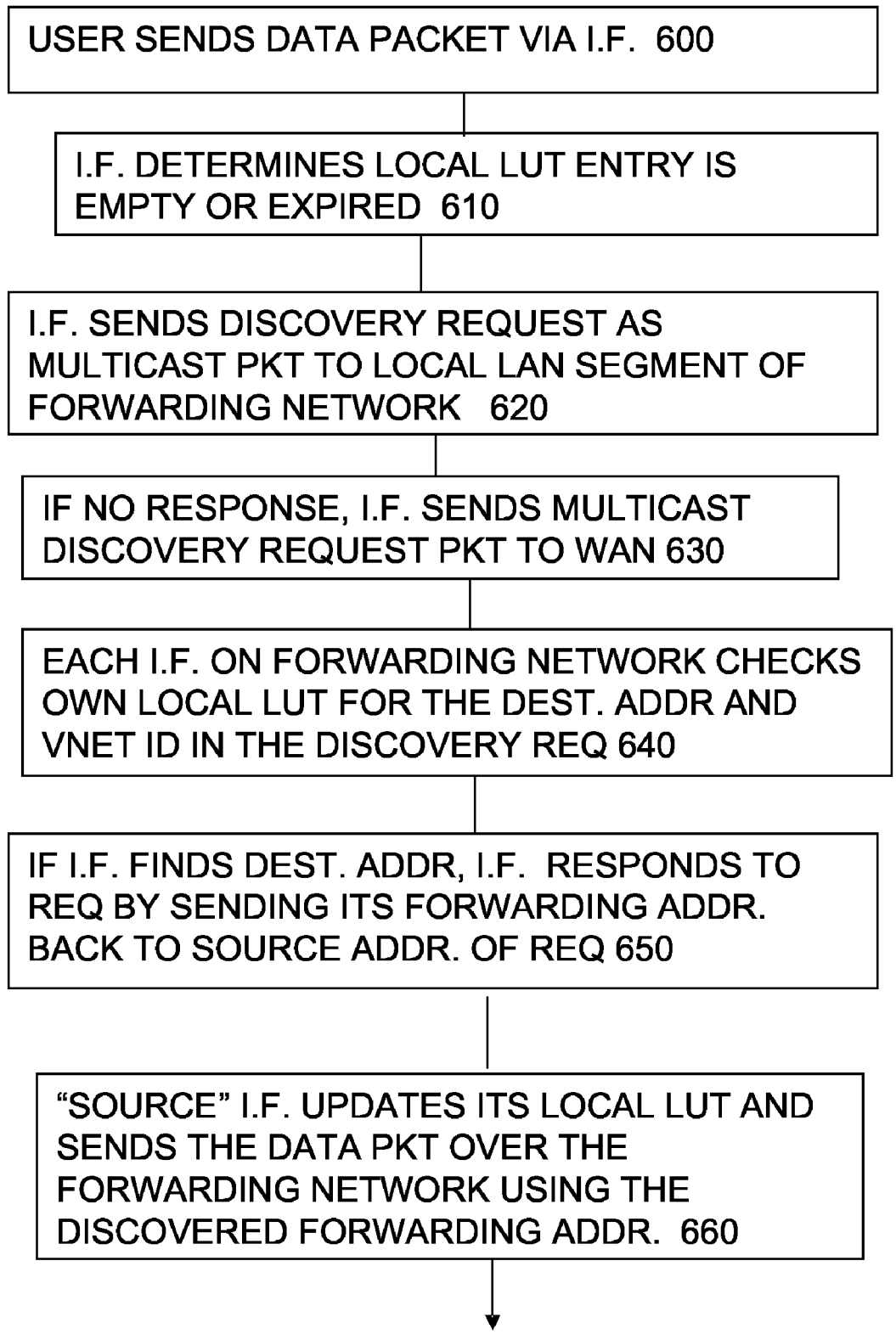
FIG. 13 shows steps for a discovery process for updating a LUT of a mapper.
Figure 14:
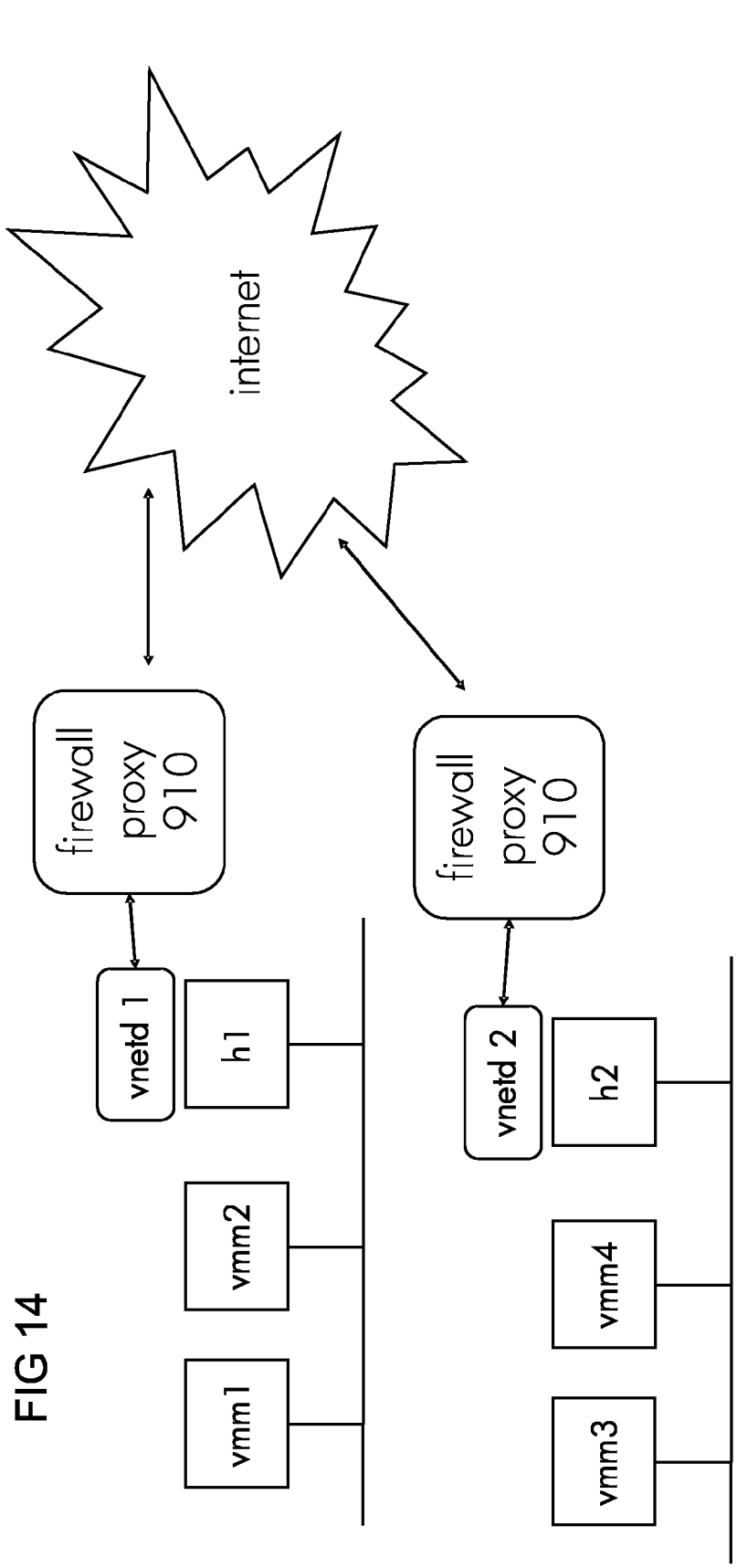
FIG. 14 shows network segments coupled by proxies and the internet.

FIGS. 13, 14, Configuring the Mapping

The mapping of virtual machine to physical machine may change when a virtual machine is booted, or may change while a virtual machine is running if it is migrated to another physical machine. This means we cannot reply on pre-configured location information—we must dynamically discover the network location of virtual interfaces.

If a virtual machine has physical network access, it can be migrated within a LAN segment without losing network connectivity. However, if it is migrated to a physical machine on a different route, for example on a different network segment, it will lose connectivity because its traffic will no longer be routed to it. The technique described here does not have this limitation—virtual interfaces can migrate out of a subnet without losing connectivity.

FIG. 13 shows some of the principal steps. At 600, as user sends a packet via the interface. The interface determines that the local LUT entry is empty or expired at 610, and initiates sending a discovery request as a multicast packet indicating the destination address for which a forwarding address is sought, shown by step 620. An implementation example of this is a UDP multicast protocol, the Virtual Address Resolution Protocol (VARP), which is used to discover physical network address of the system hosting a virtual network interface. This address is known as the care-of address or forwarding address, and may be dynamic. VARP has two messages, a VARP request and a VARP reply. A VARP request is a request for the forwarding address indicating a location of a destination address for a user, which can be represented by a virtual network interface (vif) in the address space of the virtual network. The vif in this example is identified by its (virtual)

MAC address and the id of the vnet it is on. The VARP request is sent to a configured multicast address, and the system hosting the requested address replies with a VARP reply containing the information from the request and its IP addresses. The reply is unicast to the requester's address, as shown by steps 640 and 650. As shown in FIG. 13, at step 620 the request is sent to the local LAN segment, and if no response is obtained, at step 630, the request is sent to other LAN segments in the WAN.

As UDP is unreliable, VARP clients retransmit requests if they do not receive a reply within a timeout (default 3 s). Requests are retransmitted a limited number of times (default 5). If no reply is received, traffic to the requested vif is discarded. While a vif is being resolved using VARP, outbound traffic to it is held in a bounded queue. If the queue overflows traffic is silently discarded. In a network supporting multicast routing, VARP can work in the wide area without special support. As multicast routing is not often supported, VARP by itself will only discover interfaces hosted on the local LAN segment.

However, VARP uses the same multicast address as the vnet implantation, so its messages can be forwarded in the wide-area by the vnet daemons, discussed with reference to FIG. 12, which enables VARP to traverse arbitrary network topology. A first daemon (vnetd) is used to forward the VNET multicast to remote nodes having corresponding daemons (vnetds) which simply rebroadcast incoming traffic onto their local network segment. Thus the daemons act as a virtual multipoint bridge and a VARP proxy. They are transparent to users. Otherwise routing of encapsulated traffic (unicast) to the COA forwarding address is done by the network in the normal way, and does not go through vnetd even if non-local.

Once the care-of address for a virtual address is discovered, encapsulated traffic is sent directly to the care-of address, whether the care-of address is local or not, as shown by step 660. This means that unicast vnet traffic uses the routing already configured in the network, and does not require routing changes. Also, unicast traffic does not need to be forwarded via vnetds. Care-of addresses discovered using VARP are held in the look up table (also called the VARP cache) indexed by vnet id and virtual MAC address, as shown by step 660. The VARP cache is used to lookup the care-of address for outbound frames, and VARP requests are only sent if an entry is not found. VARP cache entries are timed out (default timeout 30 s for example), after which they are resolved again if outbound traffic is to be sent.

The use of VARP means that systems hosting virtual network interfaces only need to be configured with the VARP multicast address, and not with the care-of addresses (forwarding addresses) of the virtual interfaces they will send traffic to. The care-of addresses are dynamically discovered as needed. This already supports boot time relocation of virtual interfaces. When a virtual interface is relocated at runtime, for example because of migration of the virtual machine it is attached to, existing VARP cache entries will be incorrect until they expire and the new location is discovered. The VARP cache timeout ensures that this will happen eventually, but in the meantime all traffic to the old, invalid, care-of address would be lost. This is often not acceptable, so we must take steps to avoid it. When a virtual interface moves to a new location, the receiving location multicasts a VARP reply announcing the new location. VARP implementations receiving this reply then invalidate cached VARP entries for the old location. This prevents stale care-of address information remaining in the VARP caches, and the new location of the vif will be quickly discovered. If desired, it is also possible for receivers to update the cached VARP entry from the broadcast. FIG. 14 shows an example of firewall traversal for a multicast packet such as a discovery request such as VARP. This uses proxies 910 on either side of the firewall. In this case vnetd is configured to act as a VARP proxy, so that when it forwards a VARP reply it sets the care-of address to be its own address. This causes all traffic to the proxied virtual interface to go through vnetd rather than direct to the real care-of address. This could be useful when the care-of address is in another network, separated by firewalls. Vnetd can then use a known firewall traversal method such as a VPN tunnel or sockets, to traverse the firewalls.

In effect, the vnetds act as proxies for the actual endpoints, and everything passing between these endpoints goes via these vnetds. For networks or parts of networks no supporting multicast packets, any multicast traffic including VARP packets goes via vnetd, while non multicast traffic can pass directly and bypass the vnetds.

Discovering the location of virtual interface dynamically means that pre-configuration of the location of virtual interfaces is not required, and the dynamic discovery and cached updating using VARP means that location is updated quickly when the network location of a virtual interface changes.

FIG. 15, Use of Operating System

As shown in FIG. 15, the forwarding network 40 is coupled to an I.F. as described above, by means of a network card and software in the form of an operating system 950. This is coupled to the users in the form of virtual machines VM1 and VM2 by bridges and stacks implemented in the operating system. The interfaces and bridges can be implemented in an environment such as the well known Xen operating system which can run and connect virtual machines. Virtual interfaces in Xen are connected using Ethernet bridging. As shown in FIG. 15, there is a protocol handler 990 coupled to the network card. This decapsulates incoming packets from the forwarding network and passes them to vnet interfaces VNETIF1 and VNETIF2. There is one bridge per vnetif, for passing packets to virtual interfaces VIF1.0 and VIF2.0 respectively. An incoming Ethernet packet is received from the forwarding network by the network interface, which forwards it to the operating system handler for the packet, based on the protocol identifier in the packet. In the case of virtual network packets this is the Etherip protocol, and the operating system has a kernel module registered to handle packets of this protocol (protocol handler in the figure). The protocol handler examines the packet header and extracts the virtual network identifier from it. The protocol handler decapsulates the contained Ethernet packet and causes the packet to appear as if received by the virtual network interface corresponding to the virtual network identifier (vnetif1 and vnetif2 in the FIG. 15). These interfaces are attached to the vnet bridges (bridge vif1 and vif2 in the FIG. 15) which are also connected to the virtual machines on the relevant vnets. In the FIG. 15, machine VM 1 is on vnet 1 and machine VM2 is on vnet2.

For example, an incoming virtual network packet with vnet identifier 1 will be passed to the protocol handler, decapsulated and received from interface vnetif1 connected to bridge vif1. The bridge will forward the packet to interface vif1.0 connected to vm1, where the packet will be received on eth0. The packet will not be seen by vnetif2 or eth0 on vm2 as these are on vnet 2.

For packets in the other direction, the bridges pass the packets to the virtual interface vnetifN for carrying out the outbound transform to determine the forwarding address and then encapsulate the data packet. The inbound transform receives packets from the vnetifN, and routes them to the correct virtual machine, without revealing information about the forwarding network to the virtual machine.

Routing: Bridged interfaces can't run IP so IP address for eth0 is moved to its respective bridge and routers are updated, which maintains network connectivity, as will now be explained. When an interface is connected to a bridge, incoming packets are picked up by the bridge and forwarded directly to the other attached interfaces. So the packets are not seen by higher-level protocols such as IP. So if eth0 (the default network interface) is bridged, it will tend to lose IP connectivity. However the bridge is itself represented by a network interface (e.g. provided by the operating system Xen) and if this is assigned an IP address, then packets flowing over the bridge get delivered to the IP protocol stack. This is why the IP address of eth0 is assigned to the bridge, and the routing table updated so that the default route goes to the bridge. This keeps IP connectivity.

Almost any applications can make use of virtual infrastructure or virtual networks, including any type of software including CAD, database, web page server, and other types. Virtual machines for servers and so on can be implemented using any conventional programming language, including languages such as C, and compiled following established practice. The software can run on conventional hardware with conventional processors. Other variations can be conceived within the scope of the claims.

CONCLUSIONS

As has been exemplified above, a network interface is provided for a virtual network having a number of remote interfaces coupled by a multipoint tunnel through a forwarding network, each remote interface having a forwarding address in an address space of the forwarding network, the network interface being arranged to receive data packets to be sent across the virtual network, the data packets each having a destination address in an address space of the virtual network, the network interface having an address mapper arranged to determine which of the forwarding addresses to use for each packet, according to its destination address, the corresponding forwarding addresses being reconfigurable, and the network interface being arranged to encapsulate each data packet with its forwarding address so that the forwarding network can forward the data packet transparent to its destination address, to implement the multipoint tunnel. Such an interface helps enable a more agile virtual network to be created. The address mapper being able to determine forwarding addresses for more than one of the other interfaces effectively enables the multipoint tunnel. Having a multipoint tunnel can be easier to administer than point to point tunnels, since changes to the virtual network can be achieved by reconfiguring the corresponding forwarding addresses without needing to set up new tunnels and set up routing to these different tunnels. This means that the virtual network can be more agile in that users can be added or migrated more easily, with less administrative overhead. This can be particularly useful where users are mobile or transient, or where there are many users for example. Using a tunnel for a virtual network with its own addressing scheme rather than using the forwarding network directly, means the topology and address range of the virtual network can be made independent of those of the underlying forwarding network and of any underlying physical network. The use of encapsulation enables the tunnel which helps preserve the data packets and enables the virtual network to be more independent of the forwarding network, if the forwarding network does not care about or interfere with the structure of the data packets being tunnelled. The interface helps insulate the user of the virtual network from the details of the forwarding network, such as topology, address range restrictions, how to access network services and so on. Using a forwarding network is more flexible than a VLAN approach for example because the forwarding network need not be aware of the virtual network and so no adaptation of the forwarding network or specialised hardware is needed. The combination of multipoint tunnel and reconfigurability in particular is useful, regardless of how the determination is carried out, e.g. by a mapping or an algorithm, and regardless of whether there is one or multiple virtual networks.

An additional feature is the address mapper being arranged to determine the corresponding address locally without reference to a remote centralised map. This can help enable the address to be determined with little or no need for the delay and communications bandwidth involved in accessing such a centralised resource.

Another additional feature is the address mapper having a stored mapping of addresses for determining the corresponding address. This may be easier to implement and more flexible than a pure algorithm, and easier to keep up to date as forwarding addresses change.

Another additional feature for use with multiple virtual networks, is the address mapper being arranged to determine the corresponding address according to which virtual network the data packet belongs to. This helps enable the virtual networks to have separate address ranges, and have different properties such as network topology or security properties for example.

Another additional feature, for use with multiple users, is receiving inbound tunnelled packets from the forwarding network and using the destination address of the packets to route each packet to the correct one of the users. Such routing by the interface can be preferable to passing all packets to all users and allowing them each to discard those they don't recognise. This means users can't see traffic of other users, which helps prevent snooping.

Another additional feature, for use with multiple virtual networks, is the stored mapping having an input for an identifier of the virtual network. This enables multiple networks to be used with little additional complexity or administrative overhead.

Another additional feature, for use with multiple virtual networks, is the interface being arranged to encapsulate the data packet with an indication of which of the virtual networks the data packet belongs to. This is useful to enable the receiving interface to handle the different virtual networks differently, to provide a desired level of service or security properties for example.

Another additional feature is making a user of the virtual network unaware of the corresponding forwarding address. This can be important to make the forwarding network invisible to the user so that the activities of the user cannot interfere with the forwarding network nor interfere with other virtual networks, so that security can be maintained.

Another additional feature, for use with multiple virtual networks, is the interface being arranged to determine which of the multiple virtual networks a data packet belongs to without reference to a user. This can help reduce the risk of a user gaining unauthorised access to another of the virtual networks by providing a false indication of which virtual network they belong to.

Another additional feature is the network interface being arranged to set a source address of the data packet without reference to a user. This can also help reduce the risk of a user gaining unauthorised access to another of the virtual networks by providing a false indication.

Another additional feature is the interface being arranged to intercept all the data packets sent from one or more virtual machines. This helps ensure the virtual machines are isolated and cannot interfere with each other, nor with the forwarding network.

Another additional feature, for use with virtual machines, is the interface using an operating system to provide a bridge from each of the virtual machines to the interface. This can help enable the interface to be implemented more efficiently, as such operating systems already have features for implementing a communications stack including routing to different interfaces while maintaining separation for example. This can enable an existing operating system kernel such as a Linux kernel to be used without patching.

Another additional feature is the virtual network using a network standard according to ISO layer 2. Although other higher layers such as layer 3 can be used, layer 2 has some advantages, being the lowest layer of the conventional network stack, before hardware is reached. This means more flexibility for higher layers of the stack. An example is Ethernet which is widely used.

Another additional feature is the forwarding network using a network standard according to ISO layer 3. An example is Internet Protocol. This is commercially the most widely used so is most practical.

Another additional feature is the interface being arranged to configure the stored mapping by sending a discovery request over the forwarding network. This can ease the administrative burden of setting up and maintaining the mapper.

Another additional feature is the interface being arranged to identify if the packet data is a multicast packet and if so send it to a predetermined multicast address in the forwarding network.

Another additional feature is a computer network having a first physical server arranged to run the interface, and a second physical server coupled to the first physical server by a physical link, and arranged to run a remote interface, the forwarding network being arranged to use the physical link.

Another additional feature is a VLAN interface to a virtual local area network. If a user has an existing VLAN for example then it may be more efficient to interface to it rather than tunnel underneath it, to exploit its established security and reliability.

Another additional feature, for use with multiple virtual networks, is the VLAN interface being arranged to determine from a received packet an identifier of a virtual network for that packet, and use the identifier to determine an identifier of a corresponding VLAN, for use in forwarding the packet over the VLAN.

As described above, another aspect provides a network interface for a virtual network, the virtual network having a number of remote interfaces coupled by tunnelling through a forwarding network, each remote interface having a forwarding address in an address space of the forwarding network, the network interface being arranged to receive data packets to be sent across the virtual network, the data packets having a destination address in an address space of the virtual network, the network interface having an address mapper arranged to determine which of the forwarding addresses to use for each packet, according to its destination address, the network interface being arranged to automatically configure the address mapper by sending a discovery request for a given virtual network address over the forwarding network, to prompt a response with an indication of the corresponding forwarding address, and to use the indication in such a response to configure the address mapper. This can ease the administrative burden of setting up and maintaining the address mapper. This can be important to help enable the virtual network to be more complex or more agile, to reconfigure quickly according to demand or faults for example. It also helps where users are mobile, or to enable users such as virtual machines to be migrated to other parts of the virtual network more easily. Compared to having a remote or centralised mapper, the communications overhead can be reduced if there is no need to access the remote mapper every time a packet is sent. Some of the advantage can be gained even if there is some combination of local mapper at the interface, with a centralised remote mapper.

Another additional feature is the address mapper having a look up table. This can be more convenient, more flexible and quicker than an algorithm approach, though both can be combined.

Another additional feature is the discovery request being sent to the remote interfaces to prompt one or more of them to respond. This enables a peer to peer type system, with mapping information distributed across the interfaces, with no need for a centralised store of mapping information, and with automated configuration Another additional feature is the network interface being arranged to send the discovery request according to whether a mapping of the given virtual network address is empty or time expired. This can help reduce the overhead of too many discovery requests, at the outset or while helping keep the mapper up to date.

Another additional feature is the discovery request being sent over a local LAN segment of the forwarding network first and if no response is obtained, then the interface is arranged to send the discovery request to other parts of the forwarding network. This can also help reduce the overhead involved in too many discovery requests since the discovery request is not propagated unless necessary.

Another additional feature is the discovery request being a multi cast message,

Another additional feature is the interface being arranged to send the discovery request to other parts of the network via a proxy. This can help enable the request to be propagated more easily, where multi cast messages are not handled, for example in firewall traversal or in other parts of the network where multi cast messages are not supported.

Another additional feature is the network interface being arranged to alert one or more of the remote interfaces if the data packets come from a new user having a virtual network address not yet associated with the network interface. Again this can help keep mappings up to date and help reduce discovery overhead.

Another additional feature is the discovery request having an indication of the destination address in the form of a virtual MAC address of the destination in the virtual network. This is currently a widely used standard for hardware addresses.

Another additional feature for use with multiple virtual networks, is the discovery request having an indication of which of the virtual networks the destination address applies to. This also helps enable automatic configuration of the mapper for use with multiple virtual networks.

Another aspect provides a network interface for a first physical device for sending a data packet from a local virtual machine on the first physical device to at least one other virtual machine on at least one remote physical device, coupled by a forwarding network, the data packets having a destination address of the other virtual machine in an address space of a virtual network, independent of an address space of the forwarding network, the network interface having a connection to each of the local virtual machines, and an address mapper arranged to determine a corresponding forwarding address in an address space of the forwarding network, using the destination address of each data packet, and the interface being arranged to encapsulate the data packet with the forwarding address so that the forwarding network can deliver the data packet to the remote physical device having that forwarding address. The use of encapsulation means that virtual machines on different physical devices can communicate over a virtual network transparent to the underlying forwarding network. This makes it easier to create virtual networks tailored to suit their applications yet use or share existing forwarding networks. It also makes it less likely the virtual machines will be able to interfere with the forwarding network or other users of it.

Another additional feature is the address mapper being arranged to determine the corresponding address locally without reference to a remote centralised map. This can help enable the address to be determined with little or no need for the delay and communications bandwidth involved in accessing such a centralised resource.

Another additional feature for use with multiple local virtual machines, and arranged to receive inbound encapsulated packets from the forwarding network and use the destination address of the packets to route each packet to the correct one of the local virtual machines. Such routing by the interface can be preferable to passing all packets to all users and allowing them each to discard those they don't recognise. This means users won't see others traffic of other users and thus helps limit snooping. Another additional feature is making the virtual machines are unaware of the forwarding addresses. This can be important to make the forwarding network invisible to the virtual machines so that the activities of the virtual machine cannot interfere with the forwarding network nor interfere with other virtual networks, so that security can be maintained.

Another additional feature for use with multiple virtual networks, is the interface being arranged to determine which of the multiple virtual networks the data packet belongs to without reference to the virtual machines. This can help reduce the risk of a user gaining unauthorised access to another of the virtual networks by providing a false indication of which virtual network they belong to.

Another additional feature is setting a source address of the data packet without reference to the local virtual machine. This can also help reduce the risk of a virtual machine gaining unauthorised access to another of the virtual networks by providing a false indication.

Another additional feature is the network interface being arranged to intercept all the data packets sent by the local virtual machine. This helps ensure the virtual machines are isolated and cannot interfere with each other, nor with the forwarding network.

Another additional feature is using an operating system to provide a bridge from each of the local virtual machines to the interface. This can help enable the interface to be implemented more efficiently, as such operating systems already have features for implementing a communications stack including routing to different virtual machines while maintaining separation for example. This can enable an existing operating system kernel such as a Linux kernel to be used without patching.

Another aspect provides a computer network comprising at least a first and second physical server, a plurality of virtual machines running on the first and second physical servers whereby at least one of the virtual machines runs on the first physical server and at least another one of the virtual machines runs on the second physical server, wherein the virtual machines are adapted to exchange information over a virtual network segment on which arbitrary IP and MAC addresses can be used.

Another additional feature is a plurality of virtual network segments, wherein at least one virtual machine is homed on more than one virtual network segment.

Another additional feature is at least one virtual machine implementing a virtual firewall.

The invention claimed is:

1. A network interface for a first physical device for sending a data packet from at least one local virtual machine on the first physical device to at least one other virtual machine on at least one remote physical device, coupled by a forwarding network, the network interface comprising:
    a data packet receiver configured to receive data packets having a destination address of the at least one other virtual machine in an address space of a virtual network, independent of an address space of the forwarding network;
    an address mapper arranged to determine a corresponding forwarding address in the address space of the forwarding network, using the destination address of each data packet, the address mapper having a stored mapping of addresses for determining the corresponding forwarding address, and the address mapper arranged to configure the stored mapping by sending a discovery request over the forwarding network in response to the address mapper not having a corresponding forwarding address for the data packet or in response to the corresponding forwarding address for the data packet being out of date; and
    an encapsulator arranged to encapsulate each data packet with the corresponding forwarding address so that the forwarding network can deliver the data packet to the remote physical device having that corresponding forwarding address,
    wherein the at least one local virtual machine or the at least one other virtual machine is connected to two virtual networks and has two virtual network addresses,
    wherein a source address of each data packet is set without reference to the at least one local virtual machine,
    wherein the corresponding address is determined according to which virtual network the data packet belongs to without reference to the at least one local virtual machine, and
    wherein the encapsulator encapsulates each data packet with an indication of to which virtual network the data packet belongs.

2. The network interface of claim 1, the address mapper being arranged to determine the corresponding forwarding address locally without reference to a remote centralized map.

3. The network interface of claim 1, for use with multiple local virtual machines on the first physical device, and arranged to receive inbound encapsulated packets from the forwarding network and use the destination address of the packets to route each packet to the correct one of the local virtual machines.

4. The network interface of claim 1, for use with multiple virtual networks, the stored mapping having an input for an identifier of the virtual network.

5. The network interface of claim 1, arranged such that the at least one local virtual machine on the first physical device and the at least one other virtual machine on the at least one remote physical device are unaware of the forwarding addresses.

6. The network interface of claim 1, arranged for use with multiple virtual networks, and arranged to determine which of the multiple virtual networks the data packet belongs to without reference to the at least one local virtual machine on the first physical device and the at least one other virtual machine on the at least one remote physical device.

7. The network interface of claim 1, arranged to intercept all the data packets sent by the at least one local virtual machine.

8. The network interface of claim 1, and using an operating system to provide a bridge from the at least one local virtual machine to the interface.

9. The network interface of claim 1, the virtual network using a network standard according to ISO layer 2.

10. The network interface of claim 1, the forwarding network using a network standard according to ISO layer 3.

11. The network interface of claim 1, being arranged to initialize the stored mapping by sending a discovery request over the forwarding network.

12. A computer network having a first physical server arranged to run the interface of claim 1, and a second physical server coupled to the first physical server by a physical link, and arranged to run a remote interface, the forwarding network being arranged to use the physical link.

13. A computer network comprising:
a plurality of virtual network segments;
at least a first and second physical server;
a plurality of virtual machines running on the first and second physical servers whereby at least one of the virtual machines runs on the first physical server and at least another one of the virtual machines runs on the second physical server; and
a network interface for sending a data packet from the at least one of the virtual machines to the at least another one of the virtual machines, the network interface comprising an address mapper arranged to determine a corresponding forwarding address in an address space of a forwarding network, using a destination address of the data packet, the address mapper having a stored mapping of addresses for determining the corresponding forwarding address, and the address mapper arranged to configure the stored mapping by sending a discovery request over the forwarding network in response to the address mapper not having a corresponding forwarding address for the data packet or in response to the corresponding forwarding address for the data packet being out of date,
wherein the virtual machines are adapted to exchange information over a virtual network segment on which arbitrary IP and arbitrary MAC addresses can be used,
wherein the at least one of the virtual machines is homed on more than one virtual network segment and has two virtual network addresses,
wherein a source address of the data packet is set without reference to the at least one of the virtual machines,
wherein the corresponding address is determined according to which virtual network the data packet belongs to without reference to the at least one of the virtual machines, and
wherein the data packet is encapsulated with an indication of to which virtual network the data packet belongs.

14. A computer network as claimed in claim 13, wherein the at least one of the virtual machines implements a virtual firewall.

15. A method of sending a data packet across a virtual network from a local virtual machine on a first physical device to at least one other virtual machine on at least one remote physical device, coupled by a forwarding network, the data packet having a destination address of the other virtual machine in an address space of the virtual network, independent of an address space of the forwarding network, the method having the steps of:
determining a corresponding forwarding address in the address space of the forwarding network, using the destination address of each data packet and an address mapper;
determining whether there is a corresponding forwarding address for the data packet in the address mapper;
sending a discovery request over the forwarding network to obtain a corresponding forwarding address in response to determining that there is no corresponding forwarding address for the data packet in the address mapper;
receiving the corresponding forwarding address;
encapsulating the data packet with the corresponding forwarding address;
sending the encapsulated data packet over the forwarding network for delivery to the remote physical device having that corresponding forwarding address;
setting a source address of the data packet without reference to the local virtual machine; and
determining the corresponding forwarding address according to which virtual network the data packet belongs to without reference to the local virtual machine,
wherein encapsulating the data packet comprises encapsulating the data packet with an indication of to which virtual network the data packet belongs, and
wherein the local virtual machine or the at least one other virtual machine is connected to two virtual networks and has two virtual network addresses.

16. A method of sending a data packet across a virtual network from a local virtual machine on a first physical device to at least one other virtual machine on at least one remote physical device, coupled by a forwarding network, the data packet having a destination address of the other virtual machine in an address space of the virtual network, independent of an address space of the forwarding network, the method having the steps of:
determining a corresponding forwarding address in the address space of the forwarding network, using the destination address of each data packet and an address mapper;
determining whether the corresponding forwarding address in the address mapper is out of date;
sending a discovery request over the forwarding network to obtain a corresponding forwarding address in response to determining that the corresponding forwarding address for the data packet in the address mapper is out of date;
receiving the corresponding forwarding address;
encapsulating the data-packet with the corresponding forwarding address; and
sending the encapsulated data packet over the forwarding network for delivery to the remote physical device having that corresponding forwarding address;
setting a source address of the data packet without reference to the local virtual machine; and
determining the corresponding address according to which virtual network the data packet belongs to without reference to the local virtual machine,
wherein encapsulating the data packet comprises encapsulating the data packet with an indication of to which virtual network the data packet belongs, wherein the local virtual machine or the at least one other virtual machine is connected to two virtual networks and has two virtual network addresses.

17. The method of claim 16, wherein determining whether the corresponding forwarding address in the address mapper is out of date comprises determining whether the corresponding forwarding address in the address mapper is expired.

\* \* \* \* \*